(12) United States Patent
Okumura

(10) Patent No.: US 12,063,459 B2
(45) Date of Patent: Aug. 13, 2024

(54) LIGHT TRANSMITTING DEVICE, COMMUNICATION SYSTEM, AND LIGHT TRANSMITTING METHOD

(71) Applicant: NEC Platforms, Ltd., Kawasaki (JP)

(72) Inventor: Fujio Okumura, Kanagawa (JP)

(73) Assignee: NEC Platforms, Ltd., Kanagawa (JP)

(*) Notice: Subject to any disclaimer, the term of this patent is extended or adjusted under 35 U.S.C. 154(b) by 140 days.

(21) Appl. No.: 17/781,442

(22) PCT Filed: Nov. 10, 2020

(86) PCT No.: PCT/JP2020/041899
§ 371 (c)(1),
(2) Date: Jun. 1, 2022

(87) PCT Pub. No.: WO2021/117403
PCT Pub. Date: Jun. 17, 2021

(65) Prior Publication Data
US 2022/0417478 A1    Dec. 29, 2022

(30) Foreign Application Priority Data
Dec. 12, 2019  (JP) ................ 2019-224203

(51) Int. Cl.
*H04N 9/31* (2006.01)
*H04B 10/116* (2013.01)
*H04B 10/58* (2013.01)

(52) U.S. Cl.
CPC ......... *H04N 9/3155* (2013.01); *H04B 10/116* (2013.01); *H04B 10/58* (2013.01); *H04N 9/3182* (2013.01)

(58) Field of Classification Search
CPC .. H04N 9/3155; H04N 9/3182; H04B 10/116; H04B 10/58
USPC .......................................... 348/744
See application file for complete search history.

(56) References Cited

U.S. PATENT DOCUMENTS

| 8,446,148 B2* | 5/2013 | Rehwald | G01R 33/5602 324/309 |
| 8,942,571 B2* | 1/2015 | Chen | H04B 10/116 398/183 |
| 2006/0262064 A1* | 11/2006 | Matsuura | G09G 3/3688 345/98 |

(Continued)

FOREIGN PATENT DOCUMENTS

| EP | 0332219 A2 * | 11/1989 | ............... H04N 5/21 |
| JP | H08-251520 A | 9/1996 | |

(Continued)

OTHER PUBLICATIONS

International Search Report for PCT Application No. PCT/JP2020/041899, mailed on Feb. 16, 2021.

(Continued)

*Primary Examiner* — Trang U Tran

(57) ABSTRACT

A light transmitting device that includes a light transmitter that transmits a spatial light signal including a communication signal, and a light transmission control unit that adds a dummy signal having a same brightness as a ghost image of the communication signal to the spatial light signal and controls the light transmitter in such a way that the dummy signal is displayed at a position of the ghost image.

9 Claims, 19 Drawing Sheets

(56) References Cited

U.S. PATENT DOCUMENTS

2020/0004115 A1* 1/2020 Kyosuna .................. G09G 3/36

FOREIGN PATENT DOCUMENTS

| JP | 2016-176996 A | 10/2016 |
|----|---------------|---------|
| WO | 2012/120853 A1 | 9/2012 |
| WO | 2015/049866 A1 | 4/2015 |
| WO | 2016/199415 A1 | 12/2016 |
| WO | 2016/208171 A1 | 12/2016 |
| WO | 2018/101097 A1 | 6/2018 |

OTHER PUBLICATIONS

English translation of Written opinion for PCT Application No. PCT/JP2020/041899, mailed on Feb. 16, 2021.

* cited by examiner

LIGHT TRANSMITTING DEVICE, COMMUNICATION SYSTEM, AND LIGHT TRANSMITTING METHOD

This application is a National Stage Entry of PCT/JP2020/041899 filed on Nov. 10, 2020, which claims priority from Japanese Patent Application 2019-224203 filed on Dec. 12, 2019, the contents of all of which are incorporated herein by reference, in their entirety.

TECHNICAL FIELD

The present invention relates to a light transmitting device or the like configured to transmit a spatial light signal.

BACKGROUND ART

PTL 1 discloses a projection device including a phase modulation-type spatial light modulation element. The device of PTL 1 displays a phase image for forming an image on a display face of a spatial light modulation element, and projects reflected light of light emitted to the display face to form a desired image on a screen. A projection device including a phase modulation-type spatial light modulation element concentrates energy on a portion of a desired image by operating to sequentially switch a portion on which projection light is projected. Therefore, by using the projection device including the phase modulation-type spatial light modulation element, the desired image can be displayed brighter than the projection devices including elements of other types as long as the output of the light source are the same.

The projection device including the phase modulation-type spatial light modulation element can be applied not only to image projection but also to communication (also referred to as spatial light communication) using projection light as a spatial light signal. In radio communication using radio waves, since radio waves used for communication are transmitted in all directions, the radio waves may be intercepted via a reception device disposed within a transmission range of the radio waves. On the other hand, in the spatial light communication, the interception is not performed unless another light receiving device is disposed between the light transmitting device and the light receiving device. In an image transmitted from a general projection device including a phase modulation-type spatial light modulation element, a ghost image related to a desired image is displayed at a rotationally symmetric position about zero order light. Therefore, when a projection device including a phase modulation-type spatial light modulation element is applied to spatial light communication, a ghost image related to a desired spatial light signal is displayed at an unexpected location, which may lead to leakage of information.

PTL 2 discloses a technique for making it difficult to visually recognize a ghost generated when projection light is projected by using a phase modulation-type spatial light modulation element. In the technique of PTL 2, a phase image of an image including a ghost compensation image and a desired image is displayed on a display part. By projecting reflected light of light emitted to the display part, the desired image in which the ghost compensation image is hardly visible is formed on a projected surface. The ghost compensation image is an image in which while a portion of the display information displayed on the projected surface is bright, a portion of the ghost image generated accompanying the display information is dark, and luminance is set to be high as a whole.

CITATION LIST

Patent Literature

[PTL 1] WO 2015/049866 A
[PTL 2] WO 2018/101097 A

SUMMARY OF INVENTION

Technical Problem

According to the technique of PTL 2, visibility of a ghost image can be reduced by reducing a luminance difference near the ghost image. However, even though the visibility of the ghost image decreases, when the pulse pattern of the spatial light signal is detected, information included in the spatial light signal may be leaked.

An object of the present invention is to provide a light transmitting device and the like capable of improving security in spatial light communication.

Solution to Problem

A light transmitting device according to an aspect of the present invention includes a light transmitter that transmits a spatial light signal including a communication signal, and a light transmission control unit that adds a dummy signal having a same brightness as a ghost image of the communication signal to the spatial light signal and controls the light transmitter in such a way that the dummy signal is displayed at a position of the ghost image.

In a light transmitting method executed by a computer according to an aspect of the present invention, the method includes adding a dummy signal having a same brightness as a ghost image of a communication signal to a spatial light signal, and controlling a light transmitter configured to transmit the spatial light signal in such a way that the dummy signal is displayed at a position of the ghost image.

Advantageous Effects of Invention

According to the present invention, it is possible to provide a light transmitting device and the like capable of improving security in spatial light communication.

EXAMPLE EMBODIMENT

Figure 1:
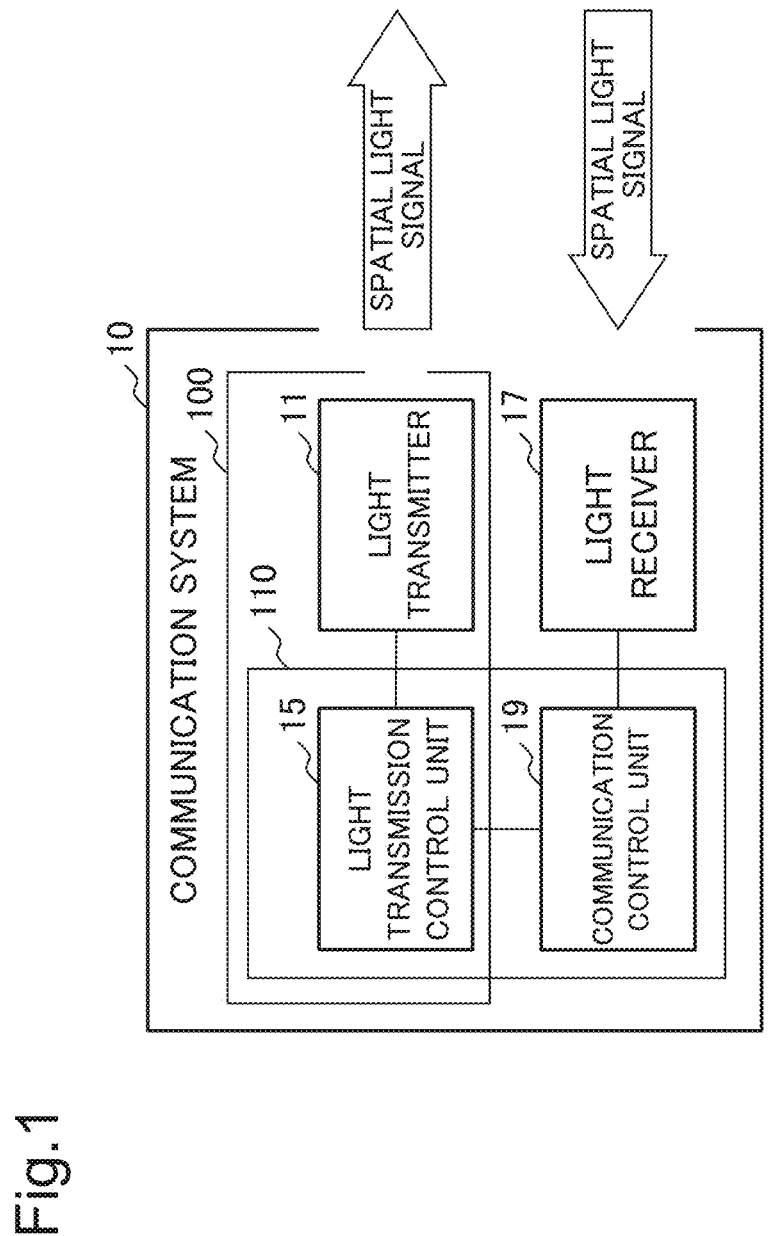
FIG. 1 is a conceptual diagram illustrating an example of a configuration of a communication system according to a first example embodiment.

Hereinafter, embodiments of the present invention will be described with reference to the drawings. However, the example embodiments described below have technically preferable limitations for carrying out the present invention, but the scope of the invention is not limited to the following. In all the drawings used in the description of the following example embodiment, the same reference numerals are given to the same parts unless there is a particular reason. In the following example embodiments, repeated description of similar configurations and operations may be omitted.

First Example Embodiment

First, a communication system according to a first example embodiment will be described with reference to the drawings. FIG. 1 is a block diagram illustrating an example of a configuration of a communication system 10 according to the present example embodiment. The communication system 10 includes a light transmitter 11, a light transmission control unit 15, a light receiver 17, and a communication control unit 19. The light transmitter 11 and the light transmission control unit 15 constitute a light transmitting device 100. The light transmission control unit 15 and the communication control unit 19 constitute a control device 110.

The light transmitter 11 is connected to the light transmission control unit 15. The light transmitter 11 is a projector including a phase modulation-type spatial light modulator. The light transmitter 11 transmits a spatial light signal including a communication signal according to the control of the light transmission control unit 15.

Figure 2:
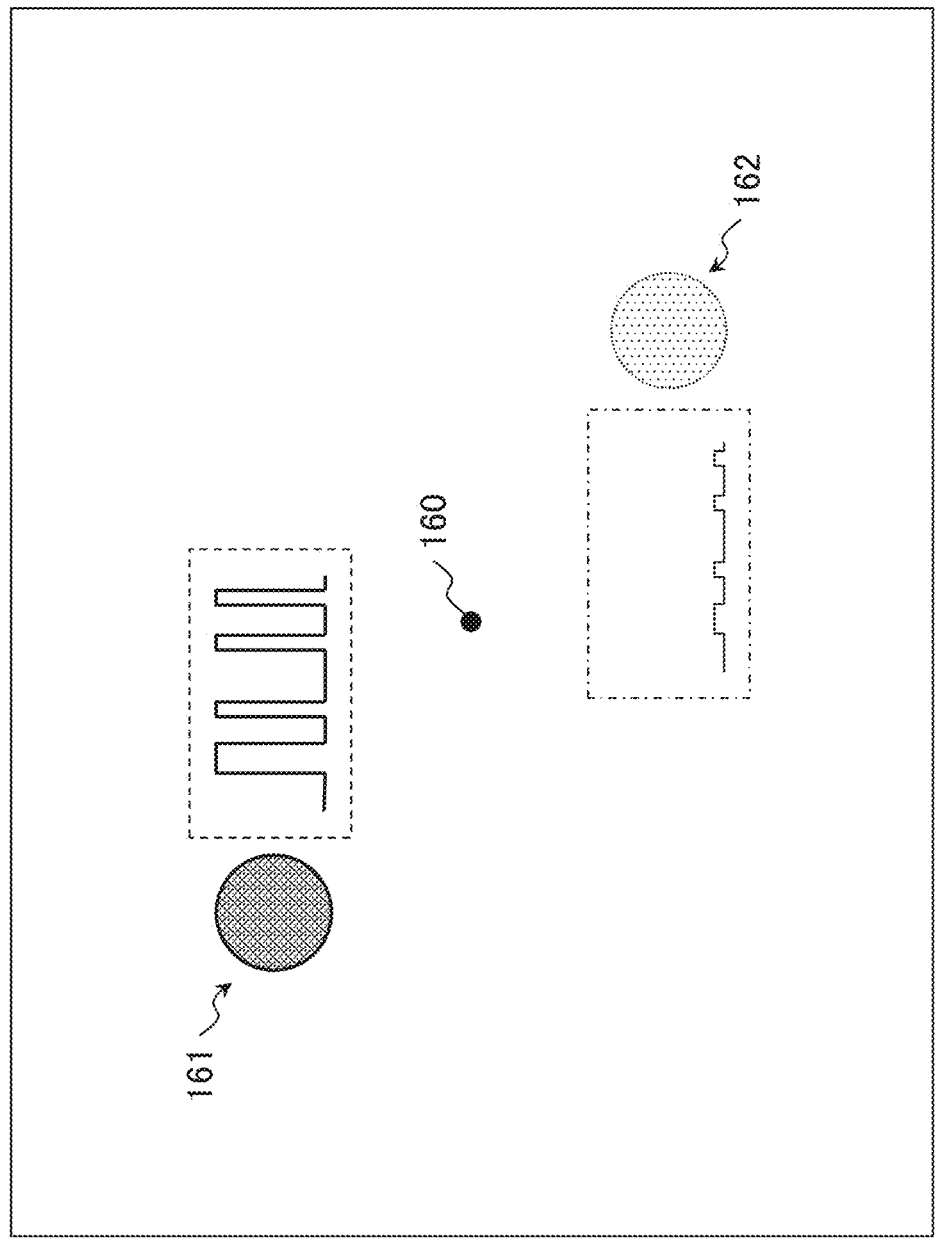
FIG. 2 is a conceptual diagram for explaining an image transmitted from a light transmitter included in the communication system according to the first example embodiment.

FIG. 2 is a conceptual diagram for describing a ghost image that may appear on the optical path of a communication signal 161 transmitted from the light transmitter 11. The spatial light signal transmitted from the light transmitter 11 includes zero order light 160 in addition to the communication signal 161. The spatial light signal transmitted from the light transmitter 11 includes a ghost image 162 at a position point-symmetric with respect to the communication signal 161 around the zero order light 160. In FIG. 2, an example (inside of a broken line) of the pattern of the communication signal 161 is illustrated on the right side of the communication signal 161, and an example (inside of a dot-and-dash line) of the pattern of the ghost image 162 is illustrated on the left side of the communication signal 161. The example of FIG. 2, which is not shown to scale, shows that the brightness of the ghost image 162 is considerably less than the brightness of the communication signal 161.

The ghost image 162 is a first order ghost image of the communication signal 161. Actually, the spatial light signal transmitted from the light transmitter 11 includes a higher order ghost image of second or higher order in addition to the first order ghost image (ghost image 162). The higher order ghost image is projected at a position different from that of the first order ghost image (ghost image 162). The second or higher order ghost image is enlarged and projected as compared with the first order ghost image (ghost image 162), and the luminance is significantly reduced. Therefore, in the luminance of the normal communication signal 161, the high order ghost image is dark to such an extent that it cannot be detected. When it is necessary to cope with a high order ghost image, the same process as the process for the first order ghost image (ghost image 162) described later may be applied to the high order ghost image.

The zero order light 160 can be suppressed by adding a configuration for shielding the zero order light 160 to the light transmitter 11. However, even when the configuration for suppressing the ghost image 162 is added to the light transmitter 11, it is difficult to completely erase the ghost image 162. Therefore, in the present example embodiment, the communication signal is prevented from being leaked even if the region including the ghost image is analyzed by transmitting the spatial light signal in which the dummy signal for adding noise to the ghost image is mixed with the communication signal.

Figure 3:
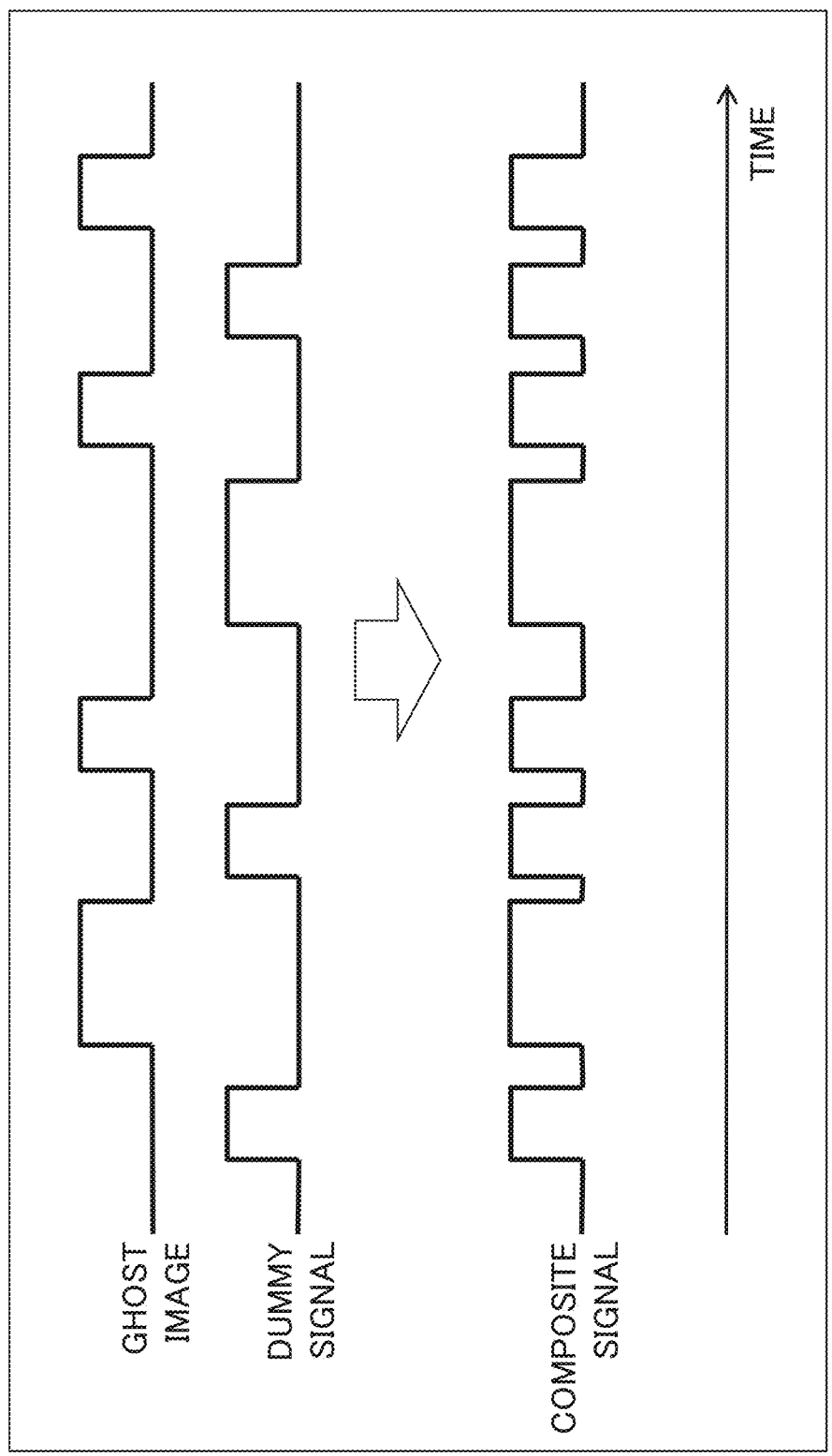
FIG. 3 is a conceptual diagram for describing an example in which a dummy signal is superimposed on a ghost image included in a spatial light signal transmitted from a light transmitter included in the communication system according to the first example embodiment.

FIG. 3 is a timing chart for describing an example of adding noise to a ghost image included in a spatial light signal transmitted from the light transmitter 11. The brightness of the ghost image included in the spatial light signal transmitted from the light transmitter 11 is smaller than the brightness of the communication signal. Therefore, from the light transmitter 11, a dummy signal having the same brightness as the brightness of the ghost image is mixed with the spatial light signal. Therefore, a composite signal obtained by combining the ghost image with the dummy signal is displayed in a region including the ghost image. As a result, even when the region including the ghost image is analyzed, the communication signal is not leaked. Transmitting a dummy signal to a region including a ghost image causes the ghost image of the dummy signal to appear in the region of the communication signal. However, since the brightness of the ghost image of the dummy signal is much smaller than that of the communication signal, there is little influence on the communication signal. For example, the brightness of the ghost image of the dummy signal is about 5% of the brightness of the dummy signal, and noise, which has about 0.25% of the brightness, is added to the brightness of the communication signal.

Figure 6:
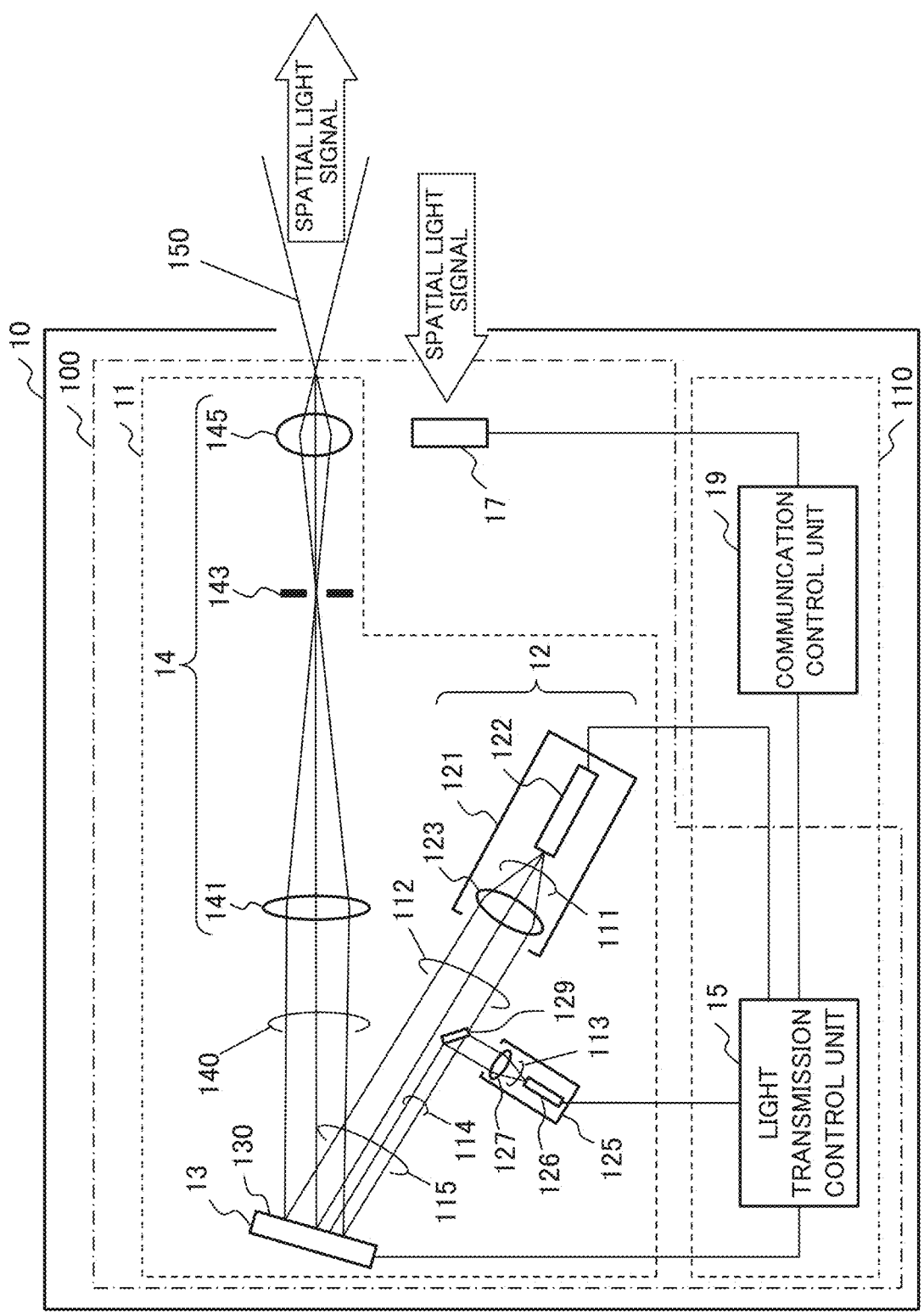
FIG. 6 is a conceptual diagram illustrating an example of a configuration of a light transmitter included in the communication system according to the first example embodiment.

The spatial light modulator of the light transmitter 11 includes a modulation part configured to display a phase image related to the spatial light signal to be transmitted. FIG. 6 is a conceptual diagram illustrating an example of a configuration of the light transmitter 11. A modulation part 130 of a spatial light modulator 13 includes a region (first region) in which a phase image of a communication signal used for communication is set and a region (second region) in which a phase image of a dummy signal for applying noise to a signal near a ghost image is set. The phase image is a pattern in which a phase image related to an image to be displayed on the face to be projected is disposed in a tile shape. The light emitted to the modulation part 130 in a state where the pattern of the phase image of the communication signal is set in the first region and the pattern of the phase image of the dummy signal is set in the second region is modulated when reflected by the modulation part 130. Modulated light 140 reflected by the modulation part 130 is transmitted as a spatial light signal 150 via a projection optical system 14.

Figure 4:
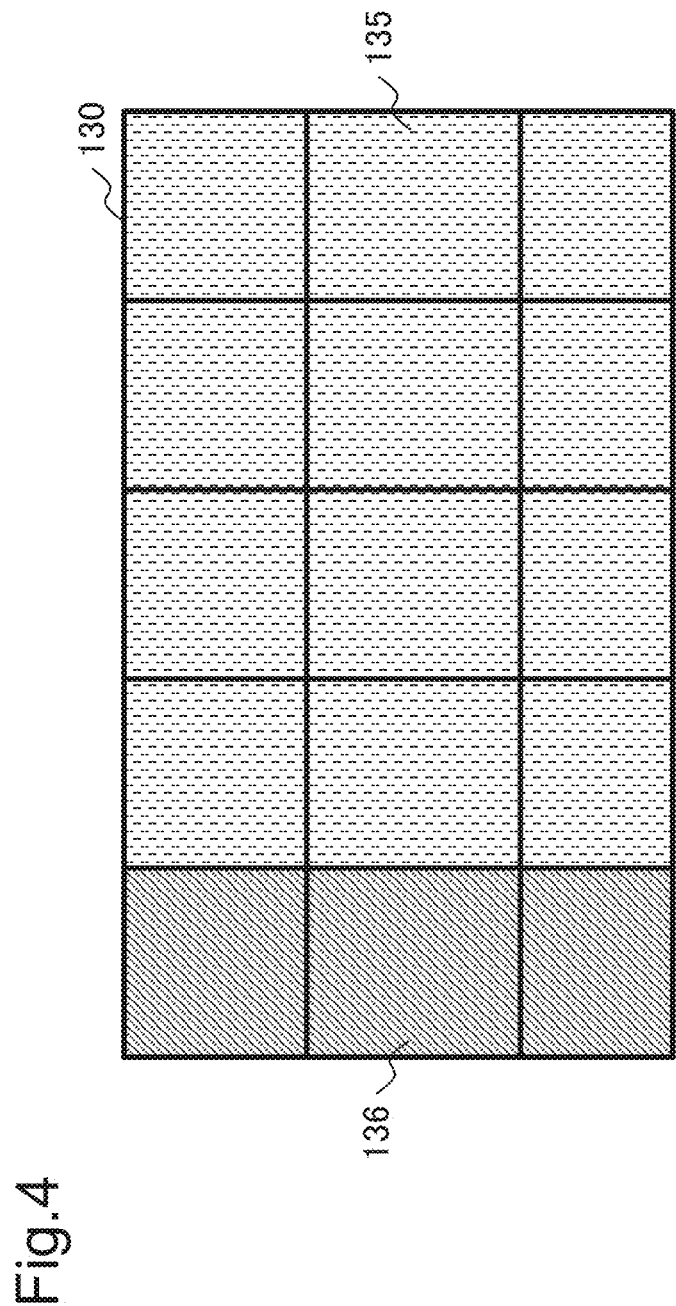
FIG. 4 is a conceptual diagram for explaining an example of allocation of a modulation part of a spatial light modulator of a light transmitter included in the communication system according to the first example embodiment.

FIG. 4 is a conceptual diagram for describing an example of region allocation of the modulation part 130 of the spatial light modulator of the light transmitter 11. FIG. 4 illustrates an example in which the right side of the region of the modulation part 130 is allocated to a first region 135, and the left end is allocated to a second region 136.

Figure 5:
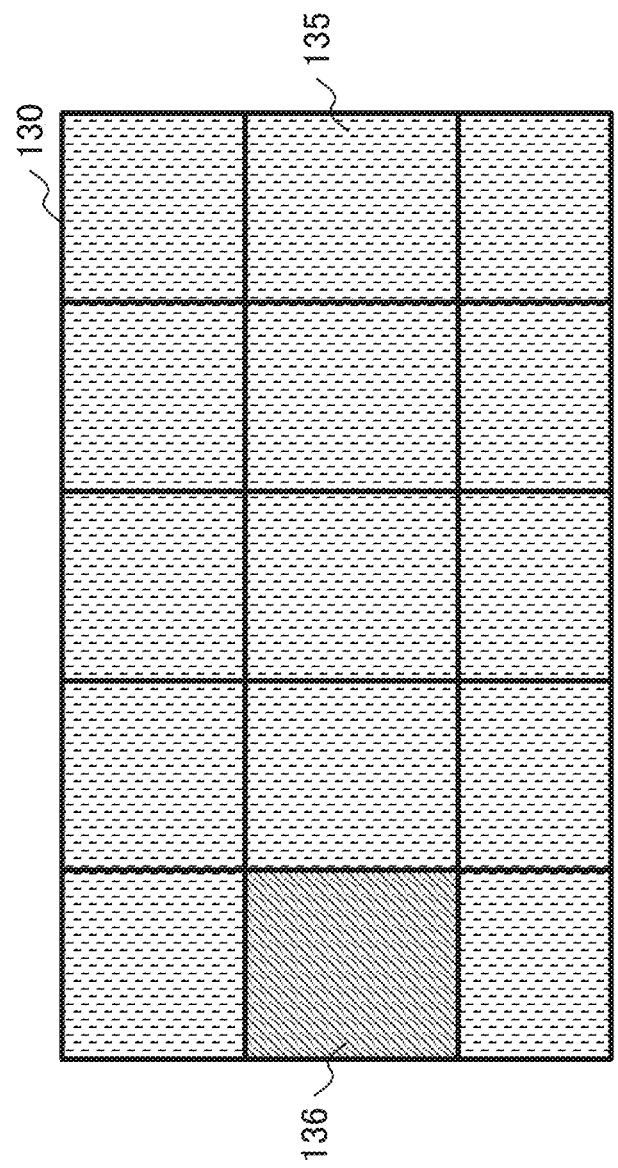
FIG. 5 is a conceptual diagram for explaining another example of allocation of a modulation part of a spatial light modulator of a light transmitter included in the communication system according to the first example embodiment.

FIG. 5 is a conceptual diagram for describing another example of region allocation of the modulation part 130 of the spatial light modulator of the light transmitter 11. FIG. 4 illustrates an example of a case where the accuracy of the irradiation range of the light source with which the modulation part 130 of the spatial light modulator is irradiated is high.

The light transmission control unit 15 is connected to the light transmitter 11 and the communication control unit 19. The light transmission control unit 15 acquires the pattern of the spatial light signal from the communication control unit 19. The light transmission control unit 15 causes the modulation part 130 of the spatial light modulator of the light transmitter 11 to display a phase image (also referred to as a communication signal phase image) of the image transmitted as the spatial light signal and a phase image (also referred to as a dummy signal phase image) of the dummy signal. In a state where the phase image of the communication signal is displayed in the first region 135 and the phase image of the dummy signal is displayed in the second region 136, the light transmission control unit 15 controls the emission timing of the light source of the light transmitter 11 in accordance with the pattern of the communication signal and causes the modulation part 130 to emit light. The reflected light modulated by the modulation part 130 is transmitted from the light transmitter 11 as a spatial light signal.

The light receiver 17 is connected to the communication control unit 19. The light receiver 17 receives a spatial light signal transmitted from another communication system 10. The light receiver 17 transmits a signal (hereinafter, also referred to as a light reception signal) according to the pattern of the received spatial light signal to the communication control unit 19. For example, the light receiver 17 can be achieved by an element such as a photodiode or a phototransistor. When the light receiver 17 is achieved by the avalanche photodiode, high-speed communication is possible. The light receiver 17 may be achieved by elements other than a photodiode, a phototransistor, and an avalanche photodiode as long as the spatial light signal can be converted into an electrical signal. The light receiver 17 may be achieved by a camera. In a case where the light receiver 17 is achieved by a camera, it is preferable to have a shutter speed at which a pulse of a spatial light signal to be received can be detected.

The communication control unit 19 is connected to a light transmission control unit 1 and the light receiver 17. The communication control unit 19 outputs the pattern of the spatial light signal to the light transmission control unit 15. For example, the communication control unit 19 is connected to an external communication control system or an external communication control device to output a light transmission pattern of a spatial light signal based on an instruction received from the system or device to the light transmission control unit 15. The communication control unit 19 acquires, from the light receiver 17, a light reception signal based on a spatial light signal transmitted from the another communication system 10. The communication control unit 19 decodes the light reception signal. The communication control unit 19 transmits the decoded signal to an external communication control system or an external communication control device.

An example of the configuration of the communication system 10 of the present example embodiment is described above. The configuration of FIG. 1 is an example and does not limit the configuration of the communication system 10.

[Light Transmitter]

Next, a configuration of the light transmitter 11 included in the communication system 10 will be described with reference to the drawing. As illustrated in FIG. 6, the light transmitter 11 includes a light source 12, a spatial light modulator 13, and a projection optical system 14. FIG. 6 is conceptual, and does not accurately represent the positional relationship between the components, the light irradiation direction, and the like.

As illustrated in FIG. 6, the light source 12 is connected to the light transmission control unit 15. The light source 12 includes a first light source 121 that emits a laser beam 111 for a communication signal, a second light source 125 that emits a laser beam 113 for a dummy signal, and a mirror 129.

The first light source 121 includes a first emitter 122 that emits the laser beam 111 in a specific wavelength region, and a collimator 123 that converts the laser beam 111 emitted from first emitter 122 into parallel light 112. The first emitter 122 emits the laser beam 111 in the specific wavelength region under the control of the light transmission control unit 15. The laser beam 111 emitted from the first emitter 122 is converted into the parallel light 112 by the collimator 123, and travels toward the first region 135 of the modulation part 130 of the spatial light modulator 13. Part of the parallel light 112 emitted from the first emitter 122 is shielded by the mirror 129, and the second region 136 of the modulation part 130 is not irradiated with the part of the parallel light.

The second light source 125 includes a second emitter 126 that emits the laser beam 113 in a specific wavelength region, and a collimator 127 that converts the laser beam 113 emitted from the second emitter 126 into parallel light 114. The second emitter 126 emits the laser beam 113 in the specific wavelength region under the control of the light transmission control unit 15. The laser beam 113 emitted from the second emitter 126 is converted into the parallel light 114 by the collimator 127, and is radiated to the reflecting surface of the mirror 129. The parallel light 114 reflected by the reflecting surface of the mirror 129 travels toward the second region 136 of the modulation part 130 of the spatial light modulator 13.

Composite light 115 obtained by combining the parallel light 112 emitted from the first light source 121 with the parallel light 114 emitted from the second light source 125 is radiated to the modulation part 130 of the spatial light modulator 13. In other words, light source 12 emits the composite light 115 obtained by combining the parallel light 112 with the parallel light 114.

The laser beam 111 emitted from the first emitter 122 and the laser beam 113 emitted from the second emitter 126 have the same wavelength region. For example, the first emitter 122 and the second emitter 126 emit infrared light in a 1.55 micrometer band from the viewpoint of eye safety. The wavelength region of the light emitted from the first emitter 122 is not limited to the 1.55 micrometer band. For example, the first emitter 122 may be configured to emit light having a wavelength in the visible region, or may be configured to emit light having a wavelength other than the visible region such as the infrared region or the ultraviolet region. The first emitter 122 may emit light other than laser beam, such as a light emitting diode, an incandescent bulb, or a discharge tube, as long as it can emit directional light.

The brightness of the laser beam 113 emitted from the second emitter 126 is controlled to be equal to the brightness of the ghost image formed by the laser beam 111 emitted from the first emitter 122. For example, the output of the first emitter 122 is set to 50 milliwatts, and the output of the second emitter 126 is set to 5 milliwatts. The wavelength region and brightness of the light emitted from the first emitter 122 and the second emitter 126 are not limited to the examples described herein.

The mirror 129 is disposed between the first light source 121 and the spatial light modulator 13 in such a way as to reflect the parallel light 114 emitted from the second emitter 126 toward the second region 136 of the modulation part 130 of the spatial light modulator 13. The parallel light 114 emitted from the second light source 125 is reflected by the reflecting surface of the mirror 129 and travels toward the second region 136 of the modulation part 130 of the spatial light modulator 13.

As illustrated in FIG. 6, in the present example embodiment, the incident angle of the composite light 115 is made non-perpendicular to the modulation part 130 of the spatial light modulator 13. That is, in the present example embodiment, the emission axis of the composite light 115 emitted from the light source 12 is inclined with respect to the modulation part of the spatial light modulator 13. When the emission axis of the composite light 115 is set obliquely with respect to the modulation part 130 of the spatial light modulator 13, the composite light 115 can be incident on the modulation part 130 of the spatial light modulator 13 without using a beam splitter, so that utilization efficiency of light can be improved. When the emission axis of the composite light 115 is set obliquely with respect to the modulation part 130 of the spatial light modulator 13, the size of the optical system of the light transmitter 11 can be made compact.

The spatial light modulator 13 is connected to the light transmission control unit 15. The spatial light modulator 13 includes the modulation part 130. The modulation part 130 of the spatial light modulator 13 is allocated to the first region 135 and the second region 136. In the first region 135, a phase image of a communication signal used for communication is displayed. In the second region 136, a phase image of a dummy signal for applying noise to a signal near the ghost image is displayed. In the modulation part 130 of the spatial light modulator 13, the phase image of the communication signal is displayed in the first region 135 and the phase image of the dummy signal is displayed in the second region 136 according to the control of the light transmission control unit 15. The position of the second region 136 is not particularly limited, but it is preferable to set the second region 136 at a position around the modulation part 130 because a shadow is generated in a portion shielded by the portion holding the mirror 129.

The modulation part 130 of the spatial light modulator 13 is irradiated with the composite light from the light source 12 according to the control of the light transmission control unit 15. The modulation part 130 of the spatial light modulator 13 is irradiated with the composite light 115 according to the pattern of the spatial light signal in a state where the phase image of the communication signal is displayed in the first region 135 and the phase image of the dummy signal is displayed in the second region 136. As a result, the modulated light 140 modulated by the modulation part 130 of the spatial light modulator 13 is emitted. The modulated light 140 modulated by the modulation part 130 of the spatial light modulator 13 travels toward the projection optical system 14.

In the modulation part 130 of the spatial light modulator 13, a plurality of reflection regions (related to pixels) capable of changing optical characteristics such as a refractive index is disposed in an array. The spatial light modulator 13 can set a phase image for displaying a desired image on the face to be projected for the modulation part 130 by setting the optical characteristics of each pixel of the modulation part 130 according to the control of the light transmission control unit 15. When the modulation part 130 of the spatial light modulator 13 is irradiated with light in a state where the phase image is set, the modulated light 140 in which the spatial distribution is modulated according to the optical characteristics of the modulation part 130 is emitted. For example, a modulator that modulates a spatial distribution such as a phase, an amplitude, an intensity, a polarization state, a propagation direction, and the like of light can be used as the spatial light modulator 13.

The spatial light modulator 13 can be achieved by a phase modulation-type spatial light modulator that modulates the phase of the incident composite light 115. Since the phase modulation-type spatial light modulator 13 is focus-free, it is not necessary to change the focal point for each distance even when light is transmitted to the display region set at a plurality of projection distances. When the phase modulation-type spatial light modulator 13 is used, energy can be concentrated on the portion of the line constituting the image by sequentially switching the region to which the spatial light signal is transmitted. Therefore, when the phase modulation-type spatial light modulator 13 is used, it is possible to display an image brighter than an image in a method of transmitting light to the entire display region as long as the outputs of the light sources are the same.

A phase image related to an image to be displayed on the face to be projected is set in the modulation part 130 of the phase modulation-type spatial light modulator 13. The phase image is a pattern in which a phase image related to an image to be displayed on the face to be projected is disposed in a tile shape. In this case, the modulated light 140 reflected by the modulation part 130 of the spatial light modulator 13 is an image in which a kind of diffraction grating forms an aggregate, and an image is formed in such a way that light diffracted by the diffraction grating gathers.

For example, the spatial light modulator 13 is achieved by a spatial light modulator using ferroelectric liquid crystal, homogeneous liquid crystal, vertical alignment liquid crystal, or the like. Specifically, the spatial light modulator 13 can be achieved by liquid crystal on silicon (LCOS). For example, the spatial light modulator 13 may be achieved by a micro electro mechanical system (MEMS). Examples of the MEMS that achieves the spatial light modulator 13 include a two-dimensional MEMS and a one-dimensional MEMS. When a laser beam in an ultraviolet region or an infrared region is emitted, MEMS may be more suitable than LCOS.

The projection optical system 14 is an optical system configured to transmit the modulated light 140 modulated by the spatial light modulator 13 as the spatial light signal 150. As illustrated in FIG. 6, the projection optical system 14 includes a Fourier transform lens 141, an aperture 143, and a projection lens 145.

The Fourier transform lens 141 is an optical lens that forms an image formed when the modulated light 140 modulated by the modulation part 130 of the spatial light modulator 13 is projected at infinity at a near focal position. In the example of FIG. 6, a focal point is formed at the position of the aperture 143.

The aperture 143 shields high order light included in the light focused by the Fourier transform lens 141 and specifies an extension of the display region. The opening of the aperture 143 is opened smaller than the outer periphery of the display region at the position of the aperture 143, and is installed in such a way as to block the peripheral region of the image at the position of the aperture 143. For example, the opening of the aperture 143 is formed in a rectangular shape or a circular shape. The aperture 143 is preferably installed at a focal position of the Fourier transform lens 141. The aperture 143 may be shifted from the focal position as long as high order light can be shielded and the display region can be specified.

The projection lens 145 is an optical lens that enlarges and projects the light focused by the Fourier transform lens 141. The projection lens 145 transmits the spatial light signal 150 in such a way that an image related to the phase image set in the modulation part 130 of the spatial light modulator 13 is formed on the face to be projected.

The configuration of the light transmitter 11 included in the communication system 10 is described above. FIG. 6 is an example and does not limit the configuration of the light transmitter 11.

[Light Transmission Control Unit]

Figure 7:
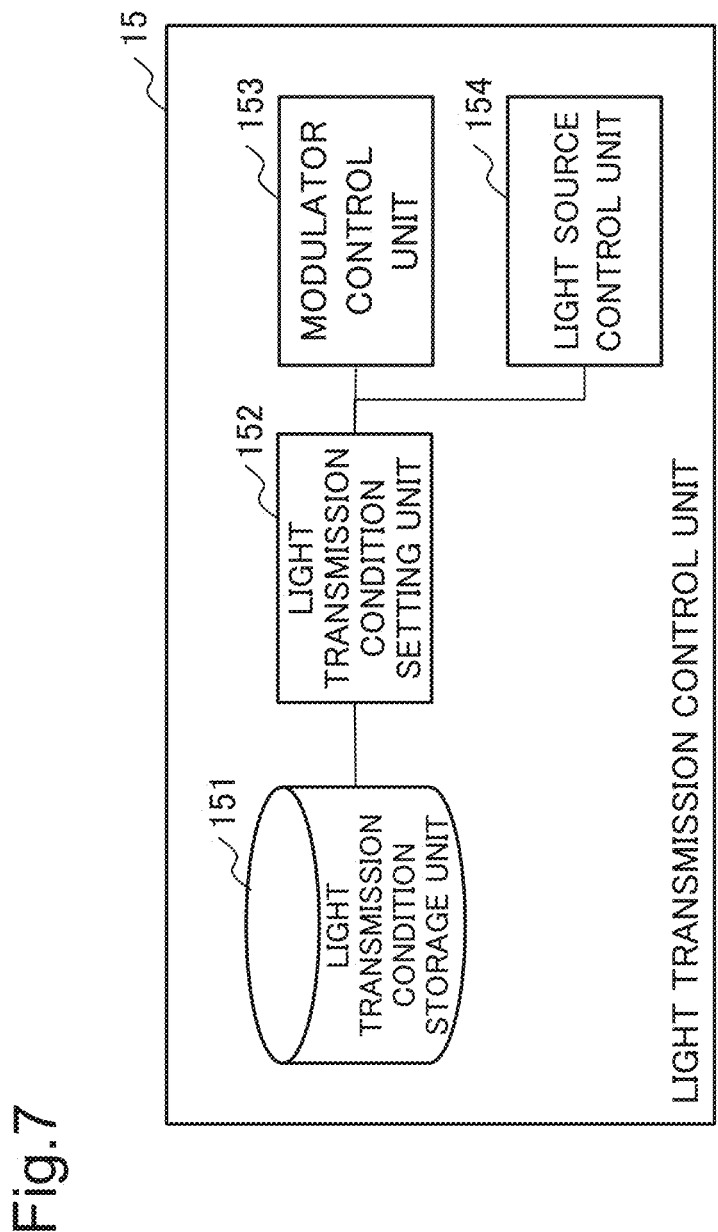
FIG. 7 is a conceptual diagram illustrating an example of a configuration of a light transmission control unit included in the communication system according to the first example embodiment.

Next, a configuration of the light transmission control unit 15 included in the communication system 10 will be described with reference to the drawing. FIG. 7 is a block diagram illustrating an example of a configuration of the light transmission control unit 15. The light transmission control unit 15 includes a light transmission condition storage unit 151, a light transmission condition setting unit 152, a modulator control unit 153, and a light source control unit 154.

The light transmission condition storage unit 151 stores a phase image related to the shape of the spatial light signal 150. For example, the shape of the spatial light signal 150 is a circle, a quadrangle, or the like. The light transmission condition storage unit 151 stores a light transmission condition including a light source control condition for controlling the first emitter 122 and the second emitter 126 included in the light source 12 and a modulation element control condition for controlling the spatial light modulator 13.

The light transmission condition setting unit 152 sets a light transmission condition for transmitting the spatial light signal 150. Specifically, the light transmission condition setting unit 152 sets, in the modulator control unit 153, a modulation element control condition for setting the phase image related to the spatial light signal 150 in the modulation part 130 of the spatial light modulator 13. The light transmission condition setting unit 152 sets, in the light source control unit 154, a light source control condition for emitting the laser beam from the first emitter 122 and the second emitter 126. The light transmission condition setting unit 152 synchronizes the timing at which the modulation element control condition is set in the modulator control unit 153 with the timing at which the light source control condition is set in the light source control unit 154, thereby transmitting a desired spatial light signal 150 from the light transmitter 11.

The modulator control unit 153 receives the phase image related to the spatial light signal 150 and the modulation element control condition from the light transmission condition setting unit 152. The modulator control unit 153 drives a driver (not illustrated) that sets the modulation part 130 of the spatial light modulator 13 according to the modulation element control condition received from the light transmission condition setting unit 152, and sets the phase image in the modulation part 130 of the spatial light modulator 13.

The light source control unit 154 receives the light source control condition from the light transmission condition setting unit 152. The light source control unit 154 drives drive units (not illustrated) of the first emitter 122 and the second emitter 126 according to the received light source control condition, and causes the first emitter 122 and the second emitter 126 to emit the laser beam.

The timing at which the phase image is set in the modulation part 130 of the spatial light modulator 13 and the timing at which the composite light 115 is emitted to the modulation part 130 in which the phase image is set are synchronized by the light transmission condition setting unit 152. Therefore, the modulation part 130 in a state where the phase image is set is irradiated with the composite light 115, and the modulated light 140 converted from the composite light 115 is transmitted as the spatial light signal 150 by the projection optical system 14.

The configuration of the light transmission control unit 15 included in the communication system 10 is described above. FIG. 7 is an example and does not limit the configuration of the light transmission control unit 15.

[Communication Control Unit]

Figure 8:
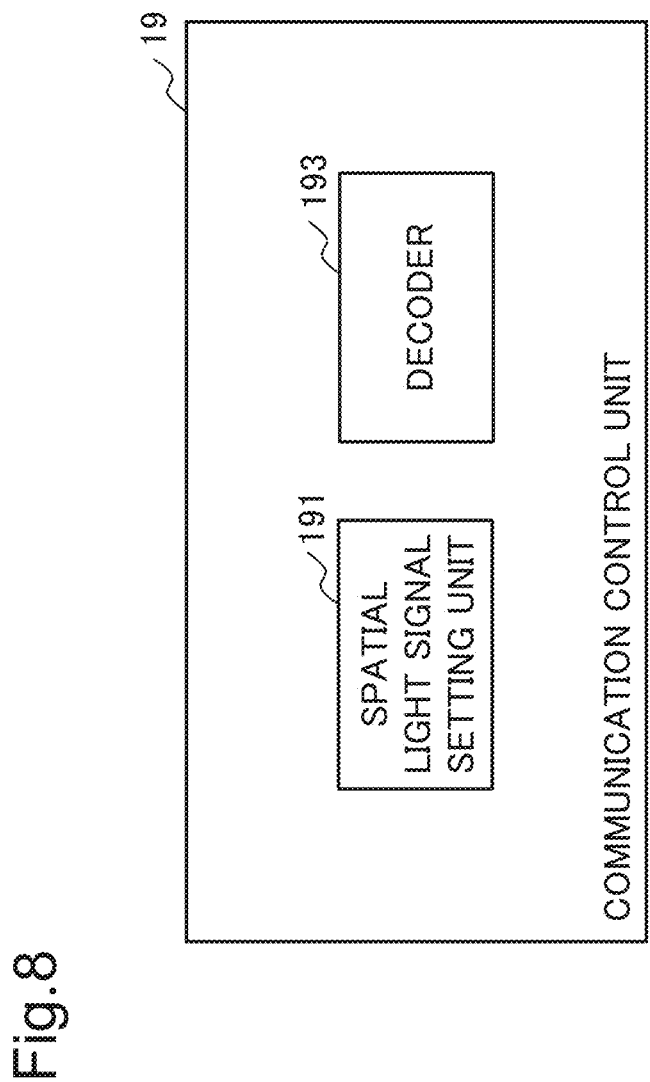
FIG. 8 is a conceptual diagram illustrating an example of a configuration of a communication control unit included in the communication system according to the first example embodiment.

Next, a configuration of the communication control unit 19 included in the communication system 10 will be described with reference to the drawing. FIG. 8 is a block diagram illustrating an example of a configuration of the communication control unit 19. The communication control unit 19 includes a spatial light signal setting unit 191 and a decoder 193.

The spatial light signal setting unit 191 sets the light transmission pattern of the spatial light signal to be transmitted in the light transmission control unit 15. For example, the spatial light signal setting unit 191 converts a signal input via a system or a device (not illustrated) using the communication system 10 into a light transmission pattern of a spatial light signal. The spatial light signal setting unit 191 outputs the converted light transmission pattern to the light transmission condition setting unit 152 of the light transmission control unit 15.

The decoder 193 receives a light reception signal related to the spatial light signal received from the another communication system 10 from the light receiver 17. The decoder 193 decodes the light reception signal. The decoder 193 transmits the decoded signal to a system or an apparatus (not illustrated) that uses the communication system 10.

The configuration of the light transmission control unit 15 included in the communication system 10 is described above. FIG. 7 is an example and does not limit the configuration of the light transmission control unit 15.

As described above, the communication system of the present example embodiment includes a light transmitting device, the light receiver configured to receive the spatial light signal transmitted from another device, and a communication control unit configured to output the light transmission pattern of the spatial light signal to the light transmission control unit and decodes the spatial light signal received by the light receiver. The light transmitting device of the present example embodiment includes the light transmitter configured to transmit a spatial light signal including a communication signal, and a light transmission control unit configured to add a dummy signal having the same brightness as a ghost image of the communication signal to the spatial light signal and control the light transmitter in such as a way that the dummy signal is displayed at a position of the ghost image.

In an aspect of the present example embodiment, the light transmitter includes a spatial light modulator, a light source, and a projection optical system. The spatial light modulator includes a modulation part having a first region in which a pattern of a phase image of a communication signal is set and a second region in which a pattern of a phase image of a dummy signal superimposed on a ghost image of the communication signal is set. The light source includes a first light source configured to emit light for transmitting a communication signal toward a first region, and a second light source configured to emit light for transmitting a dummy signal toward a second region. The projection optical system transmits light emitted from the first light source and the second light source and modulated by the modulation part as a spatial light signal.

In an aspect of the present example embodiment, the light transmission control unit sets the pattern of the phase image of the communication signal to the first region, and sets the pattern of the phase image of the dummy signal to the second region. Then, the light transmission control unit controls the timing at which the light is emitted from the first light source in such a way as to match the light transmission timing of the spatial light signal, and controls the timing at which the light is emitted from the second light source in such a way as to be shifted from the light transmission timing of the spatial light signal.

In an aspect of the present example embodiment, the light transmission control unit controls the output of the second light source in such a way that the brightness of the ghost image of the communication signal emitted from the first light source is equal to the brightness of the dummy signal.

In an aspect of the present example embodiment, the light transmission control unit controls the emission timing of the first light source in accordance with the light transmission timing of the spatial light signal, and controls the output of the second light source in such a way that the brightness of the ghost image of the communication signal emitted from the first light source is equal to the brightness of the dummy signal.

In an aspect of the present example embodiment, the light transmitting device includes a mirror that is disposed between the first light source and the spatial light modulator and reflects the light emitted from the second light source toward the second region.

In the present example embodiment, by displaying a dummy signal having low luminance overlapping with a ghost image at the position of the ghost image, a signal that can be received at the position of the ghost image is made undecodable. Therefore, according to the present example embodiment, security in spatial light communication can be improved.

Second Example Embodiment

Next, a communication system according to a second example embodiment will be described with reference to the drawings. A communication system of the present example embodiment is different from that of the first example embodiment in that a ghost image is diffused by displaying a composite image obtained by combining a virtual lens image and a phase image on a modulation part of a spatial light modulator. The communication system of the present example embodiment is different from that of the first example embodiment in the configurations of a light transmitter and a light transmission control unit. Hereinafter, the description of the same configuration as that of the first example embodiment may be omitted.

Figure 9:
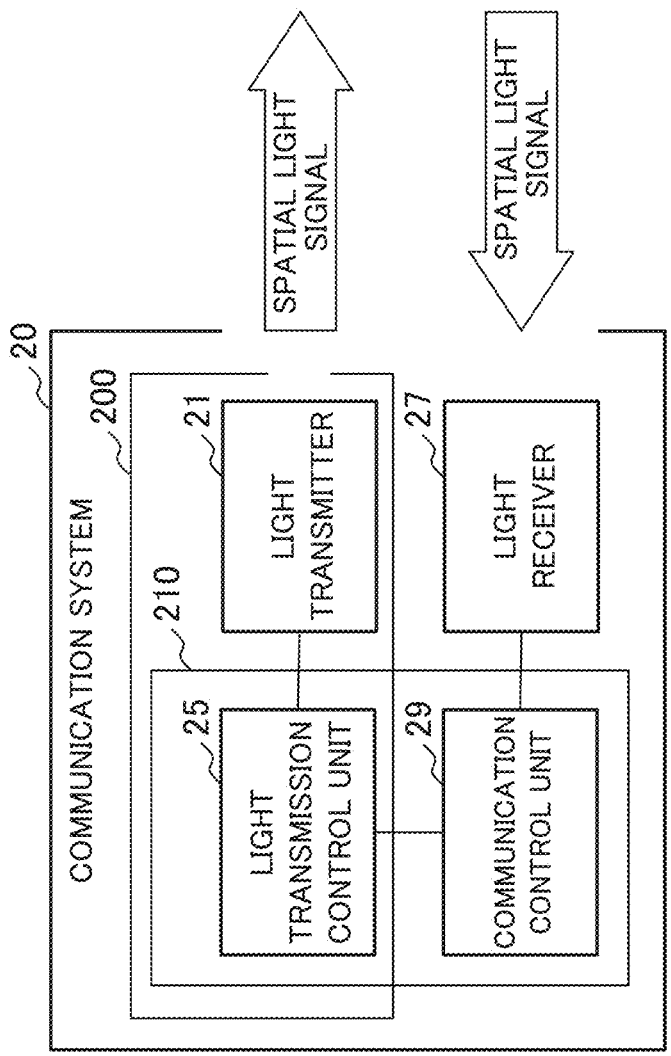
FIG. 9 is a conceptual diagram illustrating an example of a configuration of a light transmitter included in a communication system according to a second example embodiment.

FIG. 9 is a block diagram illustrating an example of a configuration of a communication system 20 of the present example embodiment. The communication system 20 includes a light transmitter 21, a light transmission control unit 25, a light receiver 27, and a communication control unit 29. The light transmitter 21 and the light transmission control unit 25 constitute a light transmitting device 200. The light transmission control unit 25 and the communication control unit 29 constitute a control device 210. Since the light receiver 27 and the communication control unit 29 are similar to the light receiver 17 and the communication control unit 19 of the first example embodiment, respectively, the description thereof is omitted.

Figure 10:
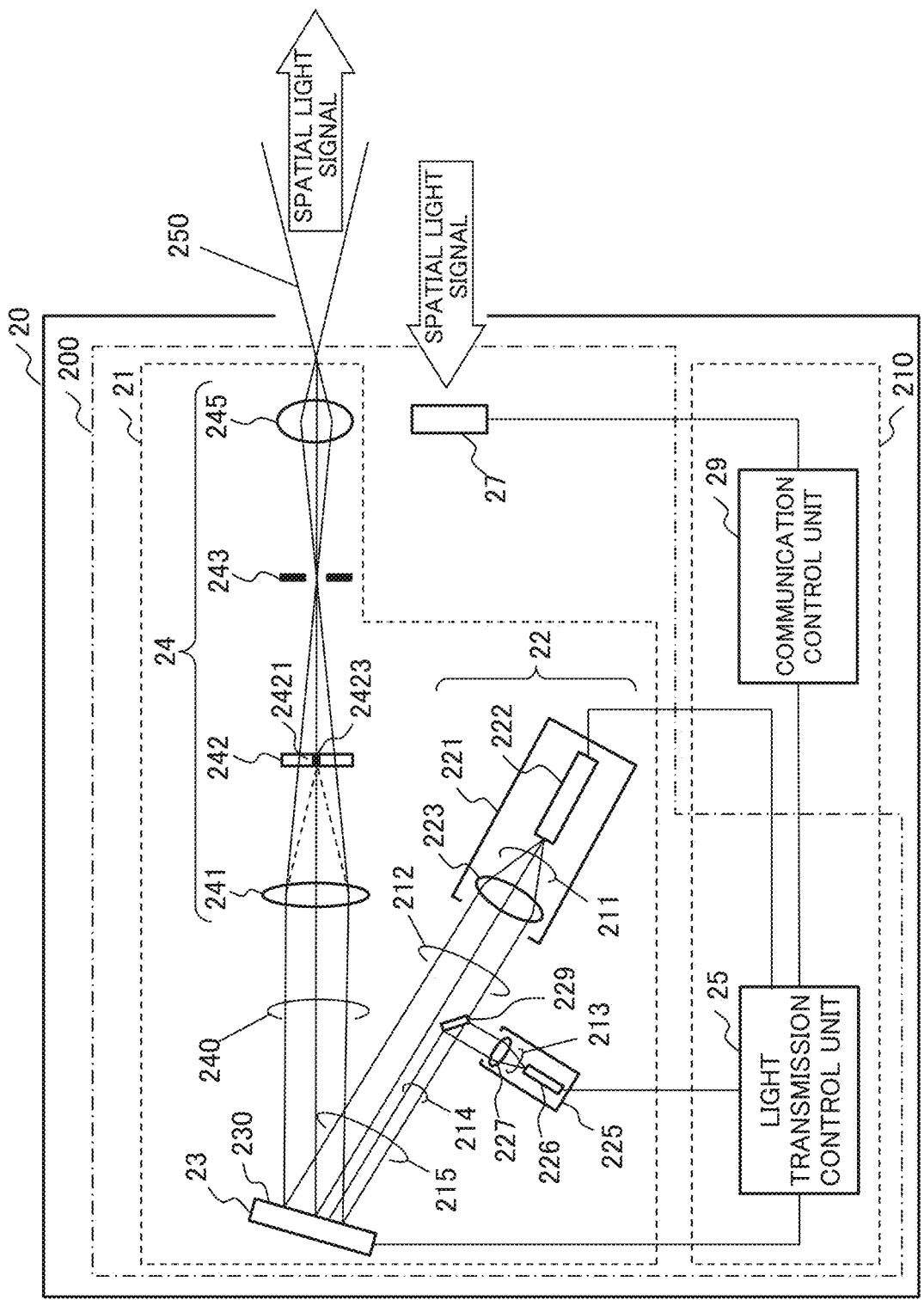
FIG. 10 is a conceptual diagram illustrating an example of a configuration of a light transmitter included in a communication system according to the second example embodiment.

FIG. 10 is a conceptual diagram illustrating an example of a configuration of the light transmitter 21. The light transmitter 21 includes a light source 22, a spatial light modulator 23 including a modulation part 230, and a projection optical system 24. The light source 22 includes a first light source 221 that emits parallel light 212 for a communication signal, a second light source 225 that emits parallel light 214 for a dummy signal, and a mirror 229. The first light source 221 includes a first emitter 222 and a collimator 223. A laser beam 211 emitted from the first light source 221 is converted into the parallel light 212 by the collimator 223. The second light source 225 includes a second emitter 226 and a collimator 227. A laser beam 213 emitted from the second light source 225 is converted into the parallel light 214 by the collimator 227. Since the configurations included in the light source 22 and the spatial light modulator 23 are similar to the respective configurations included in the light source 12 and the spatial light modulator 13 of the first example embodiment, the description thereof will be omitted. FIG. 10 is conceptual, and does not accurately represent the positional relationship between the components, the light irradiation direction, and the like.

Figure 11:
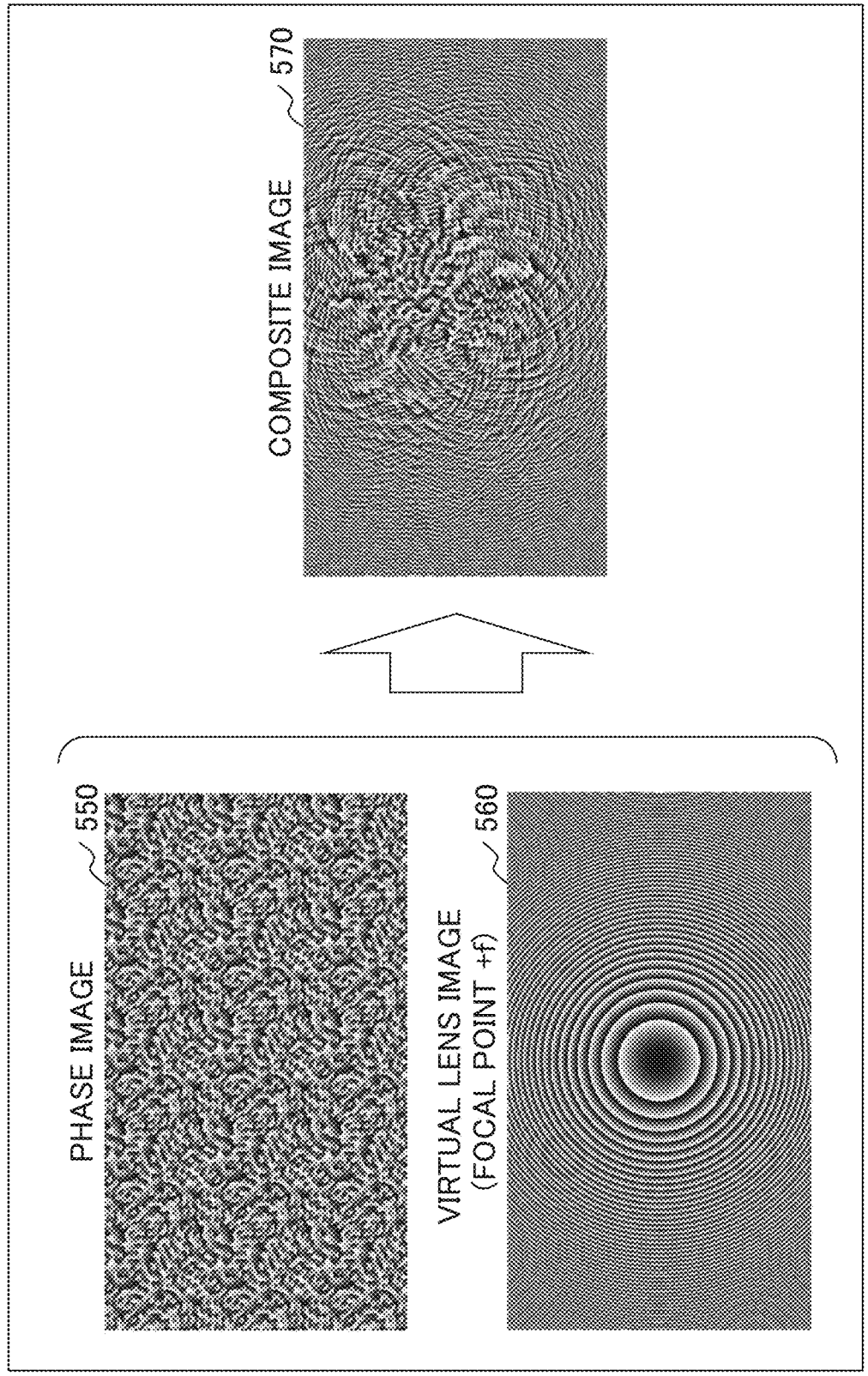
FIG. 11 is a conceptual diagram illustrating an example of a composite image generated by a light transmission control unit included in a communication system according to the second example embodiment.

A composite image generated by applying the virtual lens to the phase image is set in the modulation part 230 of the spatial light modulator 23. FIG. 11 is an example of a composite image 570 obtained by combining a virtual lens image 560 having the focal length +f with a phase image 550. The virtual lens image 560 is a lens pattern for condensing an image to be displayed on the face to be projected at a position of the focal length +f. The composite image is a pattern obtained by combining the phase image 550 with the virtual lens image 560.

As in diffraction, the wavefront of light can be controlled by phase control. When the phase changes to a spherical shape, a spherical difference is generated in the wavefront, and a lens effect is generated. That is, the virtual lens image 560 is a pattern that changes the phase of the incident light (composite light 215) to the modulation part 230 of the spatial light modulator 23 into a spherical shape and generates a lens effect of condensing the light at a predetermined focal length. The virtual lens image 560 can be controlled independently of the phase image. For example, in order to condense modulated light 240 at the position of a zero order light shield 242, one lens shape pattern is displayed as a virtual lens image on the modulation part 230 of the spatial light modulator 23.

Projection optical system 24 includes a Fourier transform lens 241, the zero order light shield 242, an aperture 243, and a projection lens 245. The projection optical system 24 is different from the projection optical system 14 of the first example embodiment in that it includes the zero order light shield 242. The Fourier transform lens 241, the aperture 243, and the projection lens 245 are similar to the Fourier transform lens 141, the aperture 143, and the projection lens 145 of the first example embodiment, respectively, and thus, a detailed description thereof is omitted. In a case where the virtual lens is required only to diffuse the ghost image, the zero order light shield 242 may be omitted.

The zero order light shield 242 includes a holding member 2421 and a light absorbing member 2423. The holding member 2421 is a member that holds the light absorbing member 2423. For example, the holding member 2421 is made of a material that easily transmits light, such as glass or plastic. When the holding member 2421 is made of plastic, it is preferable to use a material having a uniform entire surface and small phase unevenness in such a way that retardation is less likely to occur. For example, a plastic material having suppressed birefringence is suitable. For example, the holding member 2421 may include a wire material for fixing the light absorbing member 2423. For example, the peripheral edge of the holding member 2421 is formed in a frame shape, a wire material is stretched inside the opening of the frame, and the light absorbing member 2423 can be fixed by the stretched wire material. In a case where the holding member 2421 is formed of a wire material, it is only required to use a material that is not likely to deteriorate due to light in such a way that deterioration hardly occurs due to light irradiation or a wire material that is thin enough not to be irradiated with light. The light absorbing member 2423 is held by the holding member 2421 and is disposed at the focal position of the virtual lens. For example, the light absorbing member 2423 is made of a black body such as carbon. When the wavelength of the laser beam to be used is fixed, a material that selectively absorbs light having a specific wavelength may be used as the light absorbing member 2423.

Figure 12:
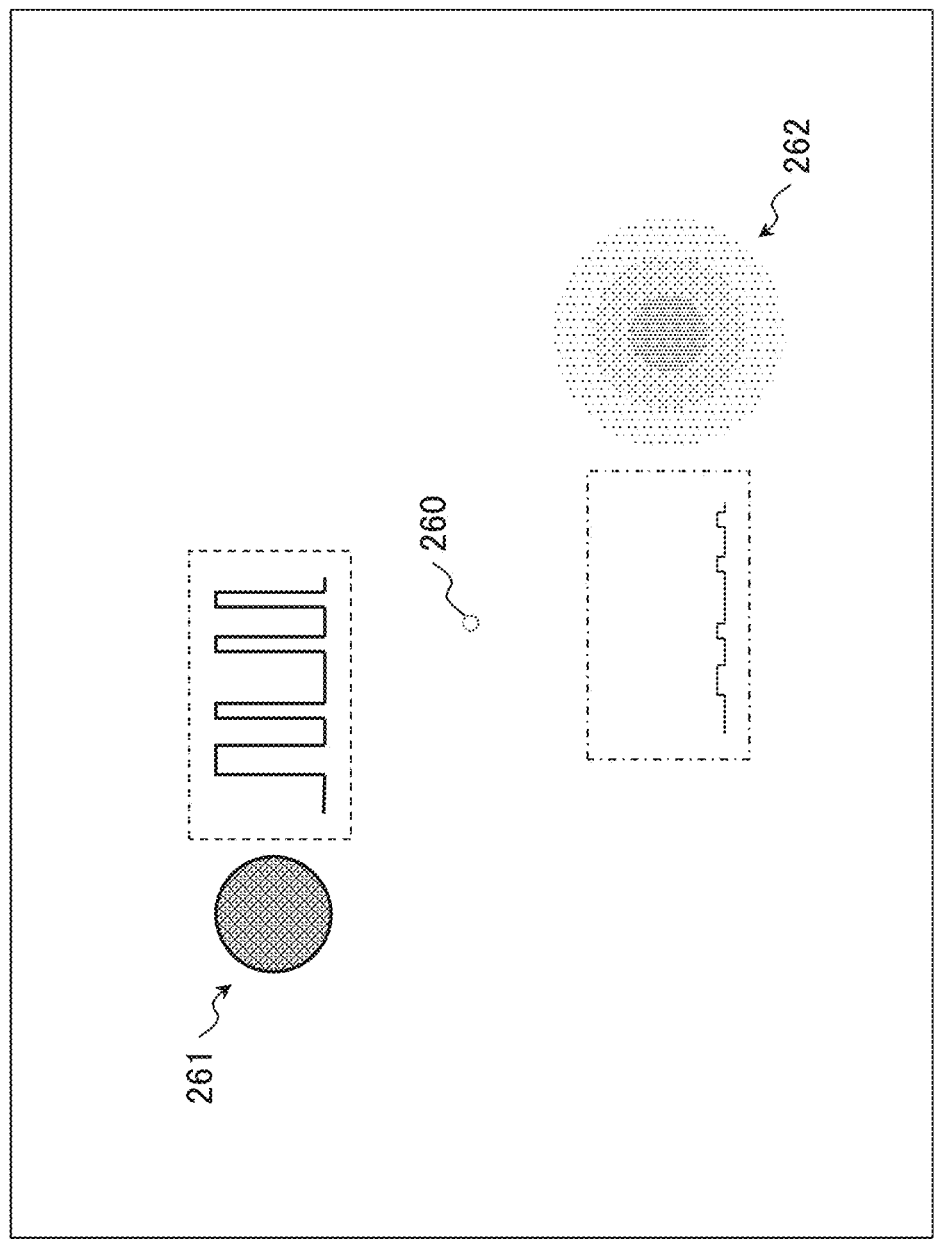
FIG. 12 is a conceptual diagram for describing an image transmitted from a light transmitter included in a communication system according to the second example embodiment.

FIG. 12 is a conceptual diagram for describing a ghost image that may appear on the optical path of a communication signal 261 transmitted from the light transmitter 21. Although the zero order light is not included in the spatial light signal transmitted from the light transmitter 21, virtual zero order light (virtual zero order light 260) is illustrated in FIG. 12 in order to facilitate description of the position of the ghost image. Since there is the zero order light shield 242, the communication signal 261 transmitted from the light transmitter 21 does not include the virtual zero order light 260. The spatial light signal transmitted from the light transmitter 21 includes a ghost image 262 at a position point-symmetric with respect to the communication signal 261 around the virtual zero order light 260. In FIG. 12, an example (inside of a broken line) of the pattern of the communication signal 261 is illustrated on the right side of the communication signal 261, and an example (inside of a dot-and-dash line) of the pattern of a ghost image 262 is illustrated on the left side of the communication signal 261. The example of FIG. 12, which is not shown to scale, illustrates that the brightness of the ghost image 262 is significantly less than the brightness of the communication signal 261. As compared with the first example embodiment (FIG. 2), since diffusion is performed using the virtual lens, the ghost image 262 of the present example embodiment is darker than the ghost image 162 of the first example embodiment. As in the first example embodiment, the ghost image 262 of the present example embodiment is a first order ghost image. Therefore, the communication signal 261 transmitted from the light transmitter 21 includes a high order ghost image. Since the high order ghost image included in the communication signal 261 is similar to the high order ghost image included in the communication signal 161 of the first example embodiment, the description thereof is omitted.

Figure 13:
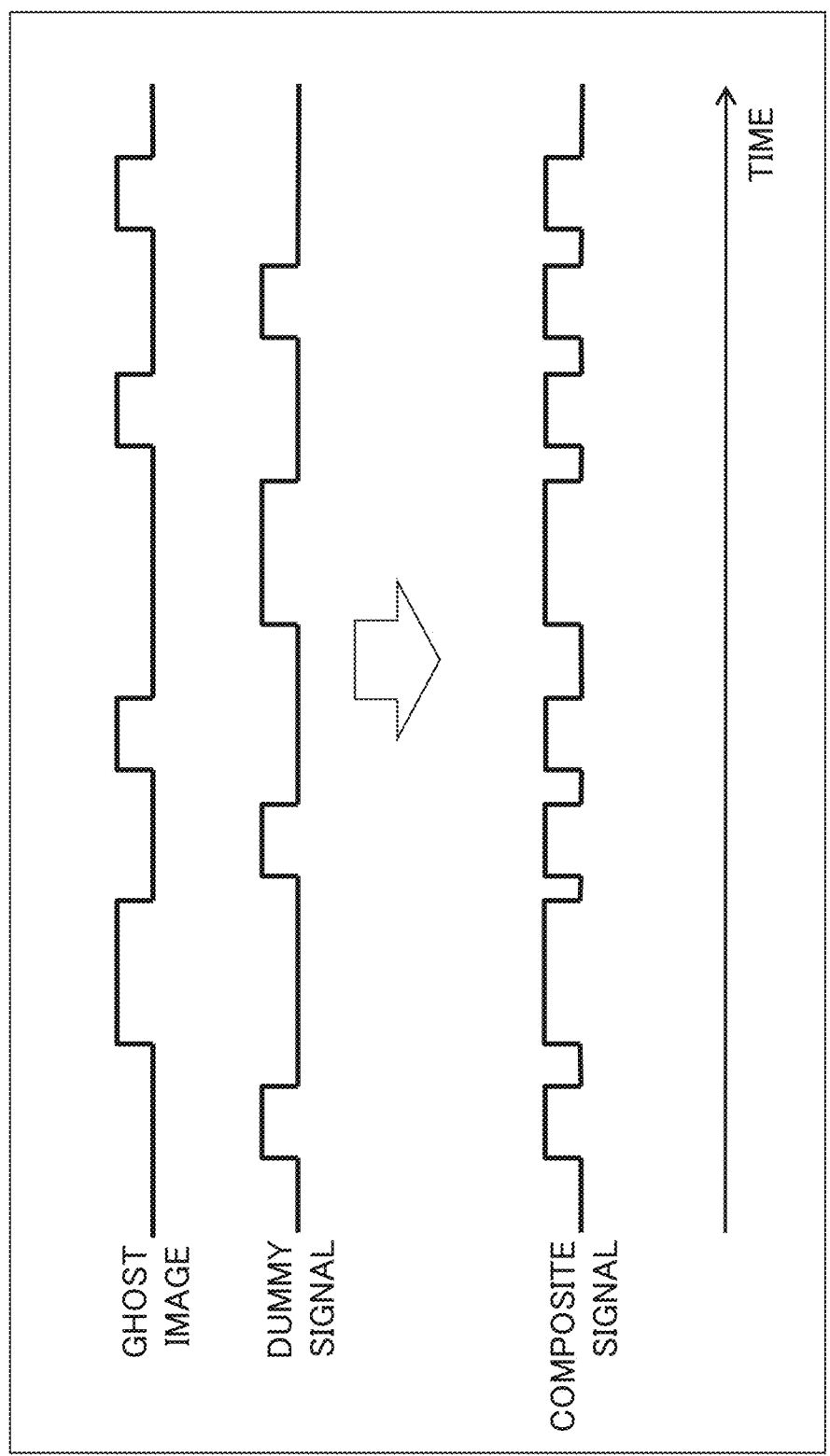
FIG. 13 is a conceptual diagram for describing an example in which a dummy signal is superimposed on a ghost image included in a spatial light signal transmitted from a light transmitter included in a communication system according to the second example embodiment.

FIG. 13 is a timing chart for describing an example of adding noise to a ghost image included in a spatial light signal transmitted from the light transmitter 21. The brightness of the ghost image included in the spatial light signal transmitted from the light transmitter 21 is darker than the brightness of the communication signal. Therefore, from the light transmitter 21, a dummy signal having the same brightness as the brightness of the ghost image is mixed with the spatial light signal. Therefore, a composite signal obtained by combining the ghost image with the dummy signal is displayed in a region including the ghost image. As a result, even when the region including the ghost image is analyzed, the communication signal is not leaked. Transmitting a dummy signal to a region including a ghost image causes the ghost image of the dummy signal to appear in the region of the communication signal. However, since the brightness of the ghost image of the dummy signal is very dark compared to the brightness of the communication signal, there is little influence on the communication signal.

The spatial light modulator 23 includes the modulation part 230 that displays a phase image related to a spatial light signal to be transmitted. The modulation part of the spatial light modulator includes a region (first region) in which a phase image of a communication signal used for communication is displayed and a region (second region) in which a phase image of a dummy signal for applying noise to a signal near a ghost image is displayed. The light transmitter 21 irradiates the modulation part 230 with light in a state where the phase image of the communication signal is displayed in the first region and the phase image of the dummy signal is displayed in the second region to transmit the reflected light modulated by the modulation part 230 as a spatial light signal.

Figure 14:
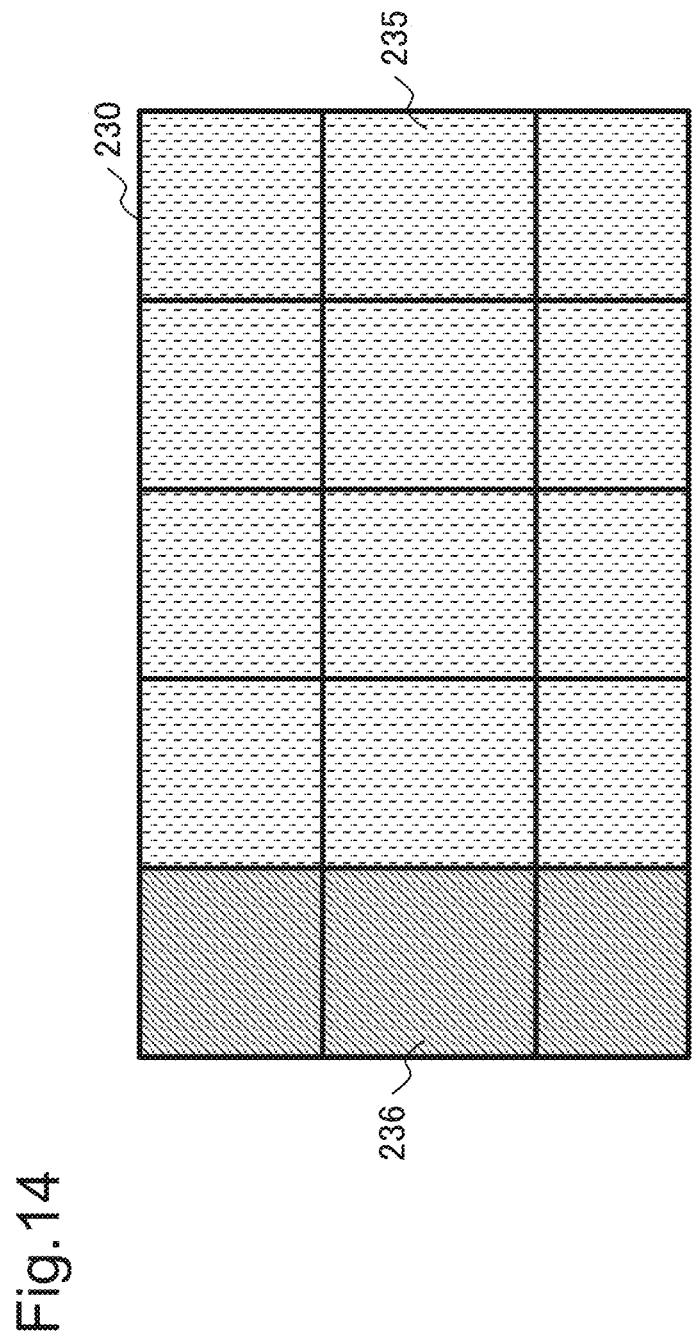
FIG. 14 is a conceptual diagram for describing an example of allocation of a modulation part of a spatial light modulator of a light transmitter included in a communication system according to the second example embodiment.

FIG. 14 is a conceptual diagram for describing an example of allocation of the modulation part 230 of the spatial light modulator 23 of the light transmitter 21. FIG. 14 illustrates an example in which the right side of the modulation part 230 is allocated to first region 235, and the left end is allocated to second region 236. For example, a composite image (also referred to as a first composite image) obtained by combining a first virtual lens focusing on a first focal point (+f) with the phase image of the communication signal is allocated to the first region 235. Then, a composite image (also referred to as a second composite image) obtained by combining the second virtual lens focused on the second focal point (−f) with the phase image of the dummy signal is assigned to the second region 236.

When the first virtual lens focusing on the first focal point (+f) is applied to the phase image of the communication signal 261, a ghost image 262 as diffused is projected as illustrated in FIG. 12. That is, when the first virtual lens is applied to the phase image of the communication signal 261, the ghost image 262 is an image whose focal point is blurred. In order to make it difficult to detect the ghost image 262, a dummy signal similar to the blurred ghost image 262 may be displayed at the position of the ghost image 262. However, when the first virtual lens focused on the first focal point (+f) is applied to a dummy signal having originally small luminance, the dummy signal itself is not blurred, and thus the dummy signal before the first virtual lens is applied is displayed at the position of the ghost image 262. Therefore, by applying the second virtual lens focusing on the second focal point (−f) to the dummy signal, the blurry dummy signal is displayed at the position of the ghost image 262, so that the ghost image 262 is hardly detected.

Applying the second virtual lens focusing on the second focal point (−f) is relevant to blurring the original image by emphasizing the ghost image. By displaying the dummy signal blurred by applying the first virtual lens focusing on the first focal point (+f) at the position of the ghost image 262, the ghost image 262 is clear. At this time, an image in which the communication signal 261 is blurred although it is considerably dark is displayed at the position of the communication signal 261. When a blurred image is mixed in the communication signal 261, the communication signal 261 is hardly detected. Therefore, the second virtual lens focused on the second focal point (−f) is applied to the dummy signal to display the blurry dummy signal at the position of the ghost image 262 and display the clear dummy signal at the position of the communication signal 261, thereby making it difficult to detect the ghost image 262.

The light transmission control unit 25 acquires the pattern of the spatial light signal from the communication control unit 29. The light transmission control unit 25 causes the modulation part 230 of the spatial light modulator 23 of the light transmitter 21 to display the first composite image of the communication signal transmitted as the spatial light signal and the second composite image of the dummy signal. In a state where the first composite image of the communication signal is displayed in the first region 235 and the second composite image of the dummy signal is displayed in the second region 236, the light transmission control unit 25 controls the emission timing of the light source of the light transmitter 21 in accordance with the light transmission pattern of the communication signal, and causes the modulation part 230 to emit light. The reflected light modulated by the modulation part 230 is transmitted from the light transmitter 21 as a spatial light signal.

An example of the configuration of the communication system 20 of the present example embodiment is described above. The configurations of FIGS. 9 to 10 are examples, and do not limit the configuration of the communication system 20.

[Light Transmission Control Unit]

Figure 15:
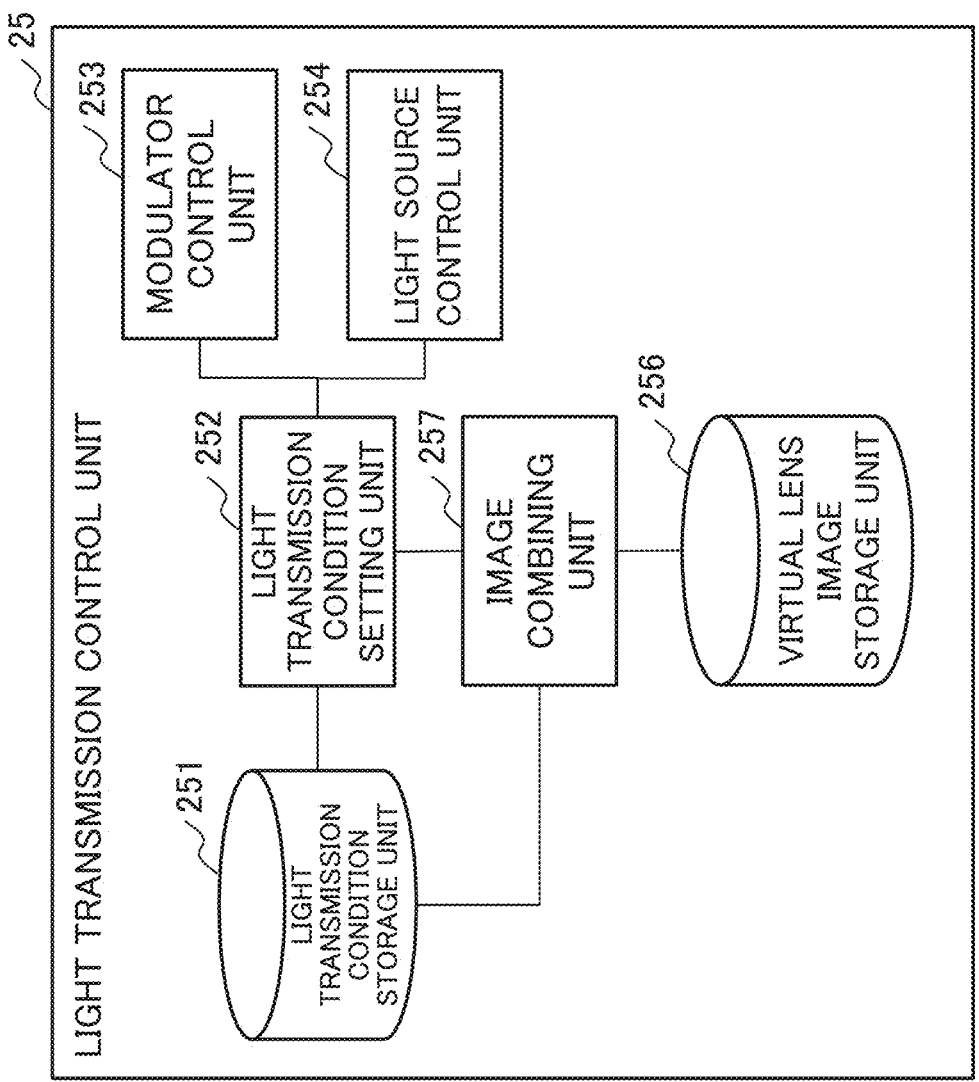
FIG. 15 is a conceptual diagram illustrating an example of a configuration of a light transmission control unit included in a communication system according to the second example embodiment.

Next, a configuration of the light transmission control unit 25 included in the communication system 20 will be described with reference to the drawing. FIG. 15 is a block diagram illustrating an example of a configuration of the light transmission control unit 25. The light transmission control unit 25 includes a light transmission condition storage unit 251, a light transmission condition setting unit 252, a modulator control unit 253, a light source control unit 254, a virtual lens image storage unit 256, and an image combining unit 257.

The light transmission condition storage unit 251 stores a phase image related to the shape of a spatial light signal 250. For example, the shape of the spatial light signal 250 is a circle, a quadrangle, or the like. The light transmission condition storage unit 251 stores a light transmission condition including a light source control condition for controlling the first emitter 222 and the second emitter 226 included in the light source 22 and a modulation element control condition for controlling the spatial light modulator 23.

The virtual lens image is stored in the virtual lens image storage unit 256. The virtual lens image stored in the virtual lens image storage unit 256 has a lens effect for condensing the modulated light 240 at the position of the zero order light shield 242. A plurality of virtual lens images according to the focal length may be stored in the virtual lens image storage unit 256.

The image combining unit 257 acquires the phase image from the light transmission condition storage unit 251 and acquires the virtual lens image from the virtual lens image storage unit 256. The image combining unit 257 combines the phase image with the virtual lens image. The image combining unit 257 outputs the composite image after combining to the light transmission condition setting unit 252.

Figure 16:
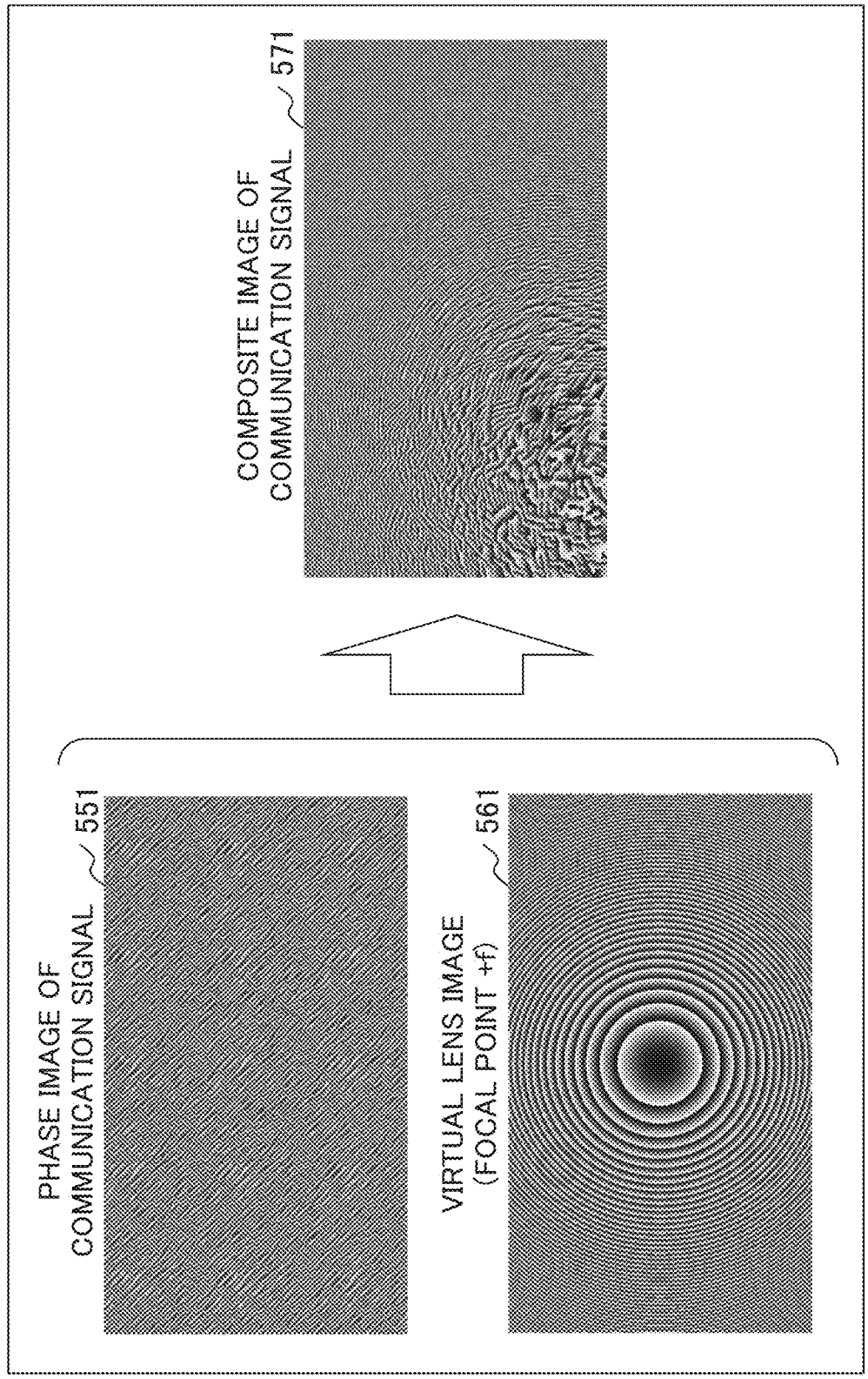
FIG. 16 is a conceptual diagram illustrating an example of a composite image of a communication signal generated by a light transmission control unit included in a communication system according to the second example embodiment.
Figure 17:
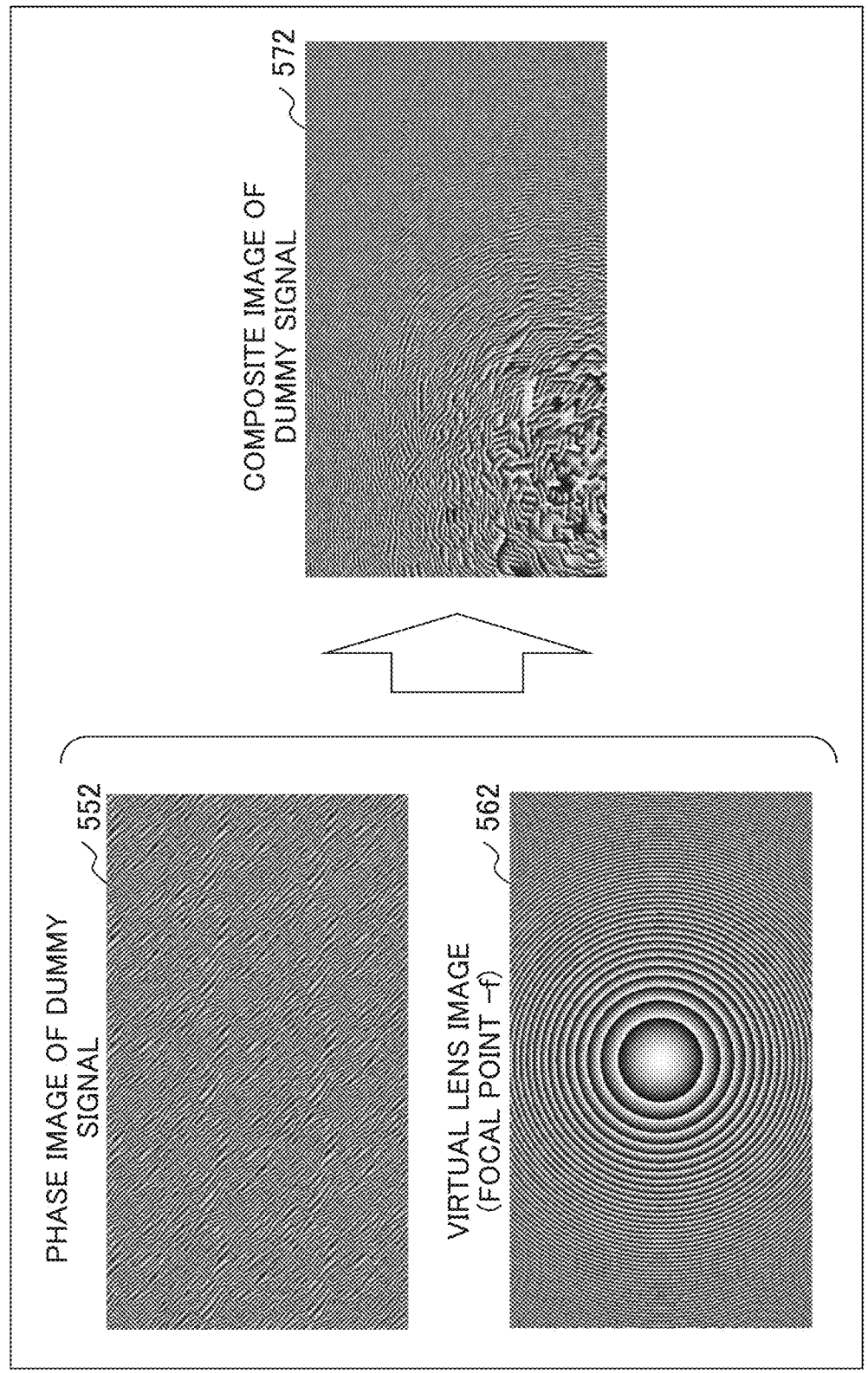
FIG. 17 is a conceptual diagram illustrating an example of a composite image of a dummy signal generated by a light transmission control unit included in a communication system according to the second example embodiment.
Figure 18:
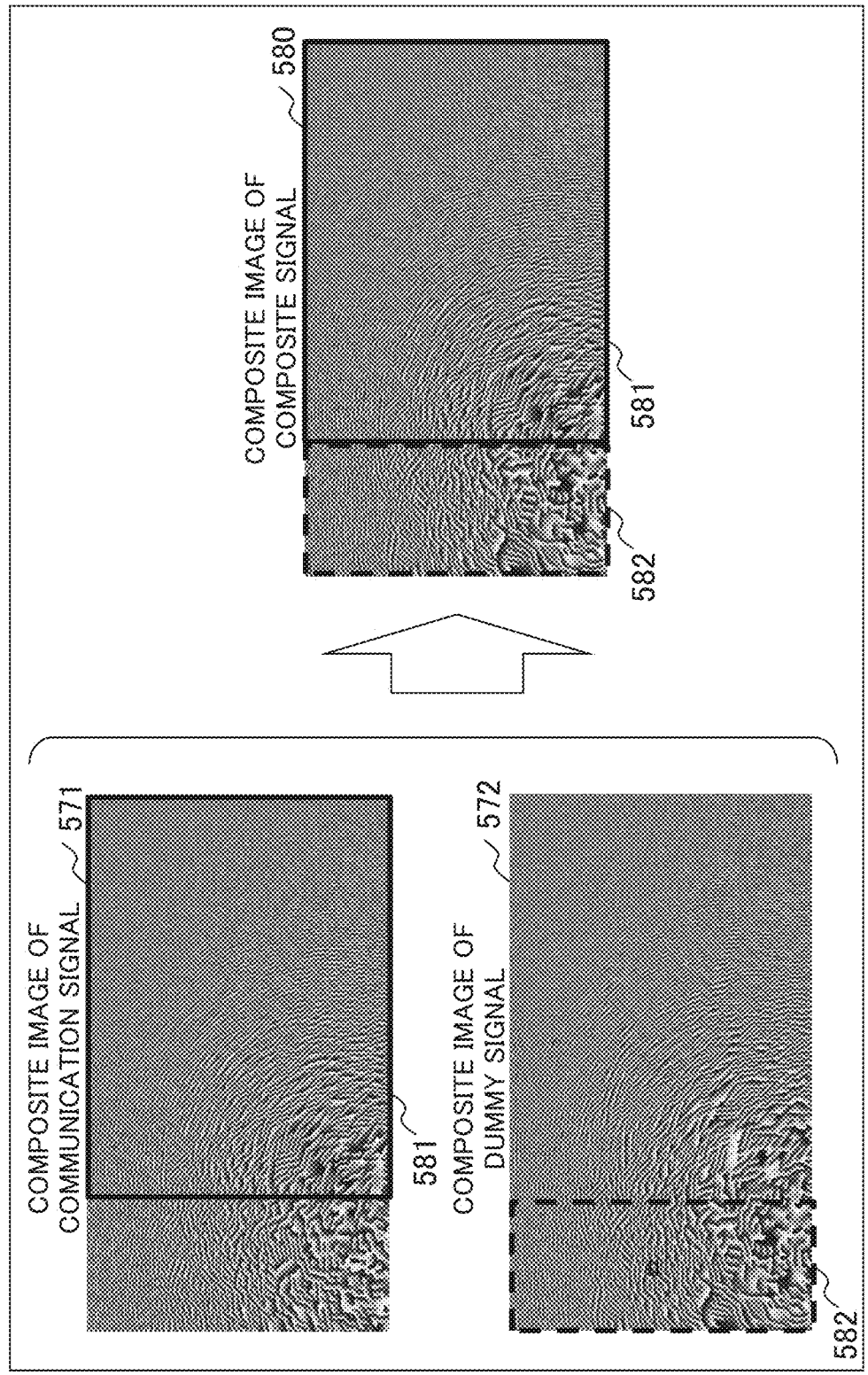
FIG. 18 is a conceptual diagram illustrating an example of a composite image of a composite signal generated by a light transmission control unit included in a communication system according to a second example embodiment.

FIG. 16 illustrates an example of a composite image 571 of the communication signal generated by combining the phase image of a virtual lens image 561 (focal point +f) with the phase image of a phase image 551 of the communication signal. FIG. 17 is an example of a composite image 572 of the dummy signal generated by combining the phase image of a virtual lens image 562 (focal point −f) with the phase image of a phase image 552 of the dummy signal. FIG. 18 is an example of a composite image 580 in which a first partial image 581 of the first region (a region inside a solid line) of a composite image 571 and a second partial image 582 of the second region (a region inside a broken line) of the composite image 572 of the dummy signal are composited. By causing the modulation part 230 of the spatial light modulator 23 to display the composite image 580 and irradiating the modulation part 230 with the composite light 115, the dummy signal is superimposed at the position of the ghost image of the communication signal and displayed, so that leakage of the communication signal can be suppressed.

The light transmission condition setting unit 252 sets a light transmission condition for transmitting the spatial light signal 250. Specifically, the light transmission condition setting unit 252 sets, in the modulator control unit 253, a modulation element control condition for setting the composite image related to the spatial light signal 250 in the modulation part 230 of the spatial light modulator 23. The light transmission condition setting unit 252 sets, in the light source control unit 254, a light source control condition for emitting the laser beam from the first emitter 222 and the second emitter 226. The light transmission condition setting unit 252 synchronizes the timing at which the modulation element control condition is set in the modulator control unit 253 with the timing at which the light source control condition is set in the light source control unit 254, thereby transmitting a desired spatial light signal 250 from the light transmitter 21.

The modulator control unit 253 receives the composite image related to the spatial light signal 250 and the modulation element control condition from the light transmission condition setting unit 252. The modulator control unit 253 drives a driver (not illustrated) that sets the modulation part 230 of the spatial light modulator 23 according to the modulation element control condition received from the light transmission condition setting unit 252, and sets the composite image in the modulation part 230 of the spatial light modulator 23.

The light source control unit 254 receives the light source control condition from the light transmission condition setting unit 252. The light source control unit 254 drives drive units (not illustrated) of the first emitter 222 and the second emitter 226 according to the received light source control condition, and causes the first emitter 222 and the second emitter 226 to emit the laser beam.

The timing at which the composite image is set in the modulation part 230 of the spatial light modulator 23 and the timing at which the modulation part 230 in which the composite image is set is irradiated with the composite light 215 are synchronized by the light transmission condition setting unit 252. Therefore, the modulation part 230 in a state where the composite image is set is irradiated with the composite light 215, and the modulated light 240 converted from the composite light 215 is transmitted as the spatial light signal 250 by the projection optical system 24.

The configuration of the light transmission control unit 25 included in the communication system 20 is described above. FIG. 15 is an example and does not limit the configuration of the light transmission control unit 25.

As described above, the light transmission control unit of the present example embodiment generates the first composite image obtained by applying the first virtual lens focused on the first focal point to the phase image of the communication signal and the second composite image obtained by applying the second virtual lens focused on the second focal point to the phase image of the dummy signal. The light transmission control unit allocates the pattern of the first partial image included in the first composite image to the first region, and allocates the pattern of the second partial image included in the second composite image to the second region.

In an aspect of the present example embodiment, the projection optical system includes a zero order light shield configured to shield zero order light included in light modulated by the spatial light modulator.

In the present example embodiment, by using the virtual lens, the focus position of the ghost image, which is the conjugate image of the communication signal, can be shifted and blurred, so that the ghost image is hardly detected. By combining the virtual lens with the dummy signal, security in spatial light communication can be further enhanced.

(Hardware)

Here, a hardware configuration for executing the processing of the control unit according to each example embodiment of the present invention will be described using the information processing apparatus 90 of FIG. 19 as an example. The information processing apparatus 90 in FIG. 19 is a configuration example for executing processing of the control unit of each example embodiment, and does not limit the scope of the present invention.

Figure 19:
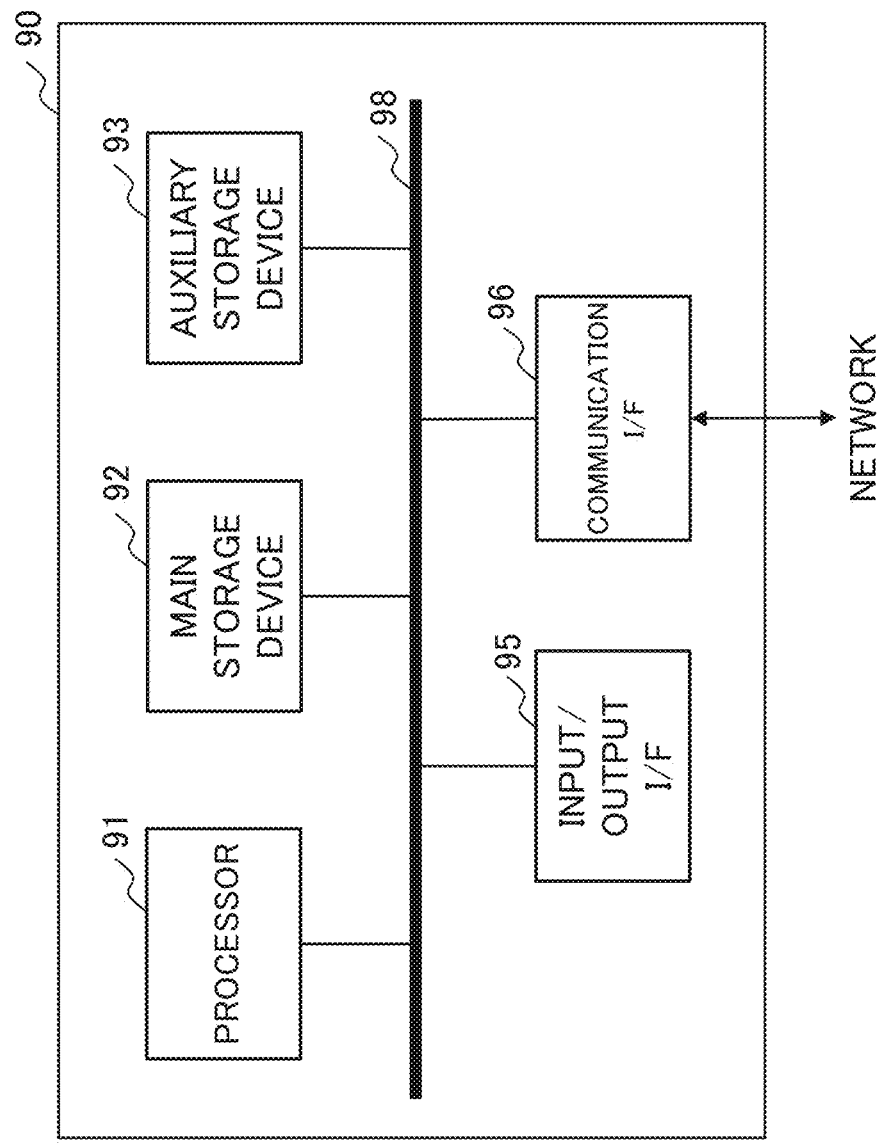
FIG. 19 is a block diagram illustrating an example of a configuration of a control device according to each example embodiment.

As illustrated in FIG. 19, the information processing apparatus 90 includes a processor 91, a main storage device 92, an auxiliary storage device 93, an input/output interface 95, and a communication interface 96. In FIG. 19, the interface is abbreviated as an interface (I/F). The processor 91, the main storage device 92, the auxiliary storage device 93, the input/output interface 95, and the communication interface 96 are data-communicably connected to each other via a bus 98. The processor 91, the main storage device 92, the auxiliary storage device 93, and the input/output interface 95 are connected to a network such as the Internet or an intranet via the communication interface 96.

The processor 91 develops the program stored in the auxiliary storage device 93 or the like in the main storage device 92 and executes the developed program. In the present example embodiment, a software program installed in the information processing apparatus 90 may be used. The processor 91 executes processing by the control unit according to the present example embodiment.

The main storage device 92 has an area in which a program is developed. The main storage device 92 may be a volatile memory such as a dynamic random access memory (DRAM). A non-volatile memory such as a magnetoresistive random access memory (MRAM) may be configured and added as the main storage device 92.

The auxiliary storage device 93 stores various pieces of data. The auxiliary storage device 93 includes a local disk such as a hard disk or a flash memory. Various pieces of data may be stored in the main storage device 92, and the auxiliary storage device 93 may be omitted.

The input/output interface 95 is an interface that connects the information processing apparatus 90 with a peripheral device. The communication interface 96 is an interface that connects to an external system or a device through a network such as the Internet or an intranet in accordance with a standard or a specification. The input/output interface 95 and the communication interface 96 may be shared as an interface connected to an external device.

An input device such as a keyboard, a mouse, or a touch panel may be connected to the information processing apparatus 90 as necessary. These input devices are used to input information and settings. When the touch panel is used as the input device, the display screen of the display device may also serve as the interface of the input device. Data communication between the processor 91 and the input device may be mediated by the input/output interface 95.

The information processing apparatus 90 may be provided with a display device that displays information. In a case where a display device is provided, the information processing apparatus 90 preferably includes a display control device (not illustrated) that controls display of the display device. The display device may be connected to the information processing apparatus 90 via the input/output interface 95.

The above is an example of a hardware configuration for enabling the control unit according to each example embodiment of the present invention. The hardware configuration of FIG. 19 is an example of a hardware configuration for executing the arithmetic processing of the control unit according to each example embodiment, and does not limit the scope of the present invention. A program for causing a computer to execute processing related to the control unit according to each example embodiment is also included in the scope of the present invention. A program recording medium in which the program according to each example embodiment is recorded is also included in the scope of the present invention.

The recording medium can be achieved by, for example, an optical recording medium such as a compact disc (CD) or a digital versatile disc (DVD). The recording medium may be achieved by a semiconductor recording medium such as a universal serial bus (USB) memory or a secure digital (SD) card, a magnetic recording medium such as a flexible disk, or another recording medium. In a case where the program executed by the processor is recorded in the recording medium, the recording medium is a program recording medium.

The components of the control unit of each example embodiment can be combined in any manner. The components of the control unit of each example embodiment may be achieved by software or may be achieved by a circuit.

While the present invention has been particularly shown and described with reference to exemplary embodiments thereof, the invention is not limited to these example embodiments. It will be understood by those of ordinary skill in the art that various changes in form and details may be made therein without departing from the spirit and scope of the present invention as defined by the claims.

This application is based upon and claims the benefit of priority from Japanese patent application No. 2019-224203, filed on Dec. 12, 2019, the disclosure of which is incorporated herein in its entirety by reference.

REFERENCE SIGNS LIST 10, 20 communication system
11, 21 light transmitter
12, 22 light source
13, 23 spatial light modulator
14, 24 projection optical system
15, 25 light transmission control unit
17, 27 light receiver
19, 29 communication control unit
100, 200 light transmitting device
110, 210 control device
121, 221 first light source
122, 222 first emitter
123, 223 collimator
125, 225 second light source
126, 226 second emitter
127, 227 collimator
129, 229 mirror
141, 241 Fourier transform lens
143, 243 aperture
145, 245 projection lens
151, 251 light transmission condition storage unit
152, 252 light transmission condition setting unit
153, 253 modulator control unit
154, 254 light source control unit
191 spatial light signal setting unit
193 decoder
242 zero order light shield
256 virtual lens image storage unit
257 Image combining unit

What is claimed is:

1. A light transmitting device comprising:
a light transmitter configured to transmit a spatial light signal including a communication signal; and
a light transmission controller that includes
at least one memory storing instructions, and
at least one processor connected to the at least one memory and configured to execute the instructions to
add a dummy signal having a same brightness as a ghost image of the communication signal to the spatial light signal and control the light transmitter in such a way that the dummy signal is displayed at a position of the ghost image, wherein
the light transmitter includes
a spatial light modulator including a modulation part allocated to a first region in which a pattern of a phase image of the communication signal is set and a second region in which a pattern of a phase image of the dummy signal superimposed on the ghost image of the communication signal is set,
a light source including a first light source configured to emit light for transmitting the communication signal toward the first region and a second light source configured to emit light for transmitting the dummy signal toward the second region, and
a projection optical system configured to transmit, as the spatial light signal, light emitted from the first light source and the second light source and modulated by the modulation part.

2. The light transmitting device according to claim 1, wherein
the at least one processor is configured to execute the instructions to
set the pattern of the phase image of the communication signal to the first region and set the pattern of the phase image of the dummy signal to the second region,
control timing at which light is emitted from the first light source in such a way as to match light transmission timing of the spatial light signal, and
control timing at which light is emitted from the second light source in such a way as to be shifted from the light transmission timing of the spatial light signal.

3. The light transmitting device according to claim 1, wherein
the at least one processor is configured to execute the instructions to
control output of the second light source in such a way that brightness of the ghost image of the communication signal emitted from the first light source is equal to brightness of the dummy signal.

4. The light transmitting device according to claim 1, wherein
the at least one processor is configured to execute the instructions to
control emission timing of the first light source in such a way as to match light transmission timing of the spatial light signal, and
control output of the second light source in such a way that brightness of the ghost image of the communication signal emitted from the first light source is equal to brightness of the dummy signal.

5. The light transmitting device according to claim 1, further comprising:

a mirror that is disposed between the first light source and the spatial light modulator and that reflects light emitted from the second light source toward the second region.

6. The light transmitting device according to claim 1, wherein
the at least one processor is configured to execute the instructions to
generate a first composite image obtained by applying a first virtual lens focused on a first focal point to the phase image of the communication signal and a second composite image obtained by applying a second virtual lens focused on a second focal point to the phase image of the dummy signal,
allocate a pattern of a first partial image included in the first composite image to the first region, and
allocate a pattern of a second partial image included in the second composite image to the second region.

7. The light transmitting device according to claim 1, wherein
the projection optical system includes
a zero order light shield configured to shield zero order light included in light modulated by the spatial light modulator.

8. A communication system comprising:
the light transmitting device according to claim 1,
a light receiver configured to receive the spatial light signal transmitted from another device; and
a communication controller configured to output a light transmission pattern of the spatial light signal to the light transmission controller and decode the spatial light signal received by the light receiver.

9. A light transmitting method executed by a computer and comprising:
adding a dummy signal having a same brightness as a ghost image of a communication signal to a spatial light signal; and
controlling a light transmitter configured to transmit the spatial light signal in such a way that the dummy signal is displayed at a position of the ghost image, wherein
the light transmitter includes
a spatial light modulator including a modulation part allocated to a first region in which a pattern of a phase image of the communication signal is set and a second region in which a pattern of a phase image of the dummy signal superimposed on the ghost image of the communication signal is set,
a light source including a first light source configured to emit light for transmitting the communication signal toward the first region and a second light source configured to emit light for transmitting the dummy signal toward the second region, and
a projection optical system configured to transmit, as the spatial light signal, light emitted from the first light source and the second light source and modulated by the modulation part.

* * * * *